United States Patent [19]

Ishibashi et al.

[11] Patent Number: 5,610,761
[45] Date of Patent: Mar. 11, 1997

[54] TELESCOPE HAVING MECHANISM FOR AUTOMATICALLY RETURNING OPTICAL SYSTEM TO A REFERENCE DIOPTRIC POWER

[75] Inventors: Kenji Ishibashi; Kazuo Kimura, both of Sakai; Iwao Ishida, Higashiosaka; Kiyoshi Nishitani, Sakai, all of Japan

[73] Assignee: Minolta Co., Ltd., Osaka, Japan

[21] Appl. No.: 365,506

[22] Filed: Dec. 28, 1994

[30] Foreign Application Priority Data

Dec. 28, 1993 [JP] Japan ................................. 5-337330

[51] Int. Cl.⁶ ........................................... G02B 23/00
[52] U.S. Cl. ............................... 359/407; 359/410
[58] Field of Search .............................. 359/399, 404, 359/405, 407, 410

[56] References Cited

FOREIGN PATENT DOCUMENTS 63-206731  8/1988  Japan.
5-11195   1/1993  Japan.

Primary Examiner—Timothy P. Callahan
Assistant Examiner—Jeffrey Zweizig
Attorney, Agent, or Firm—Brinks, Hofer, Gilson & Lione

[57] ABSTRACT

A focusing lens for adjusting the dioptric power in accordance with the user's dioptric power is provided in each of right and left lens barrels. When a main switch dial is set at a normal position, a microcomputer sets the focusing lens at a dioptric power of 0 by controlling a motor so that the focusing lens moves to a position corresponding to a dioptric power of 0.

13 Claims, 36 Drawing Sheets

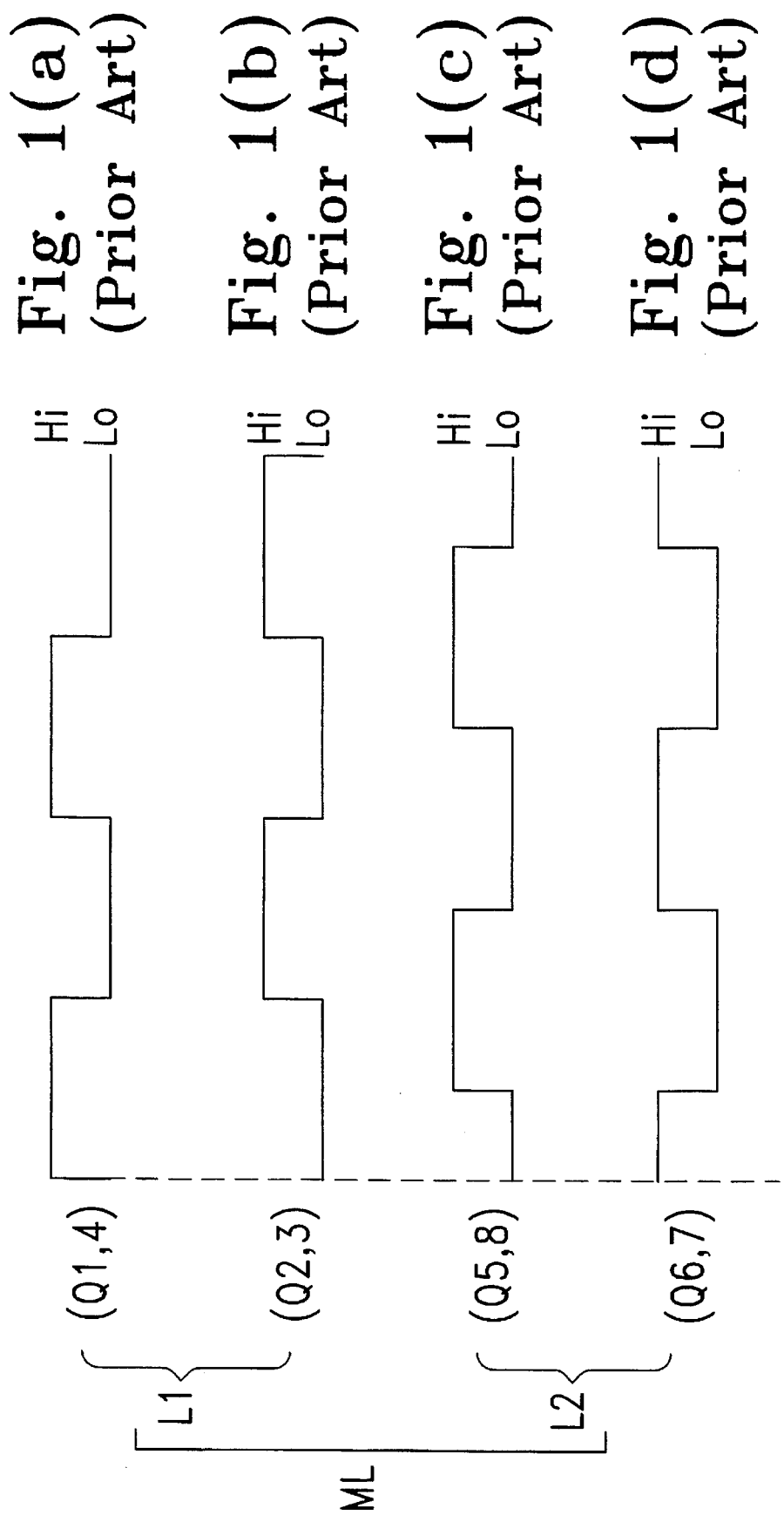

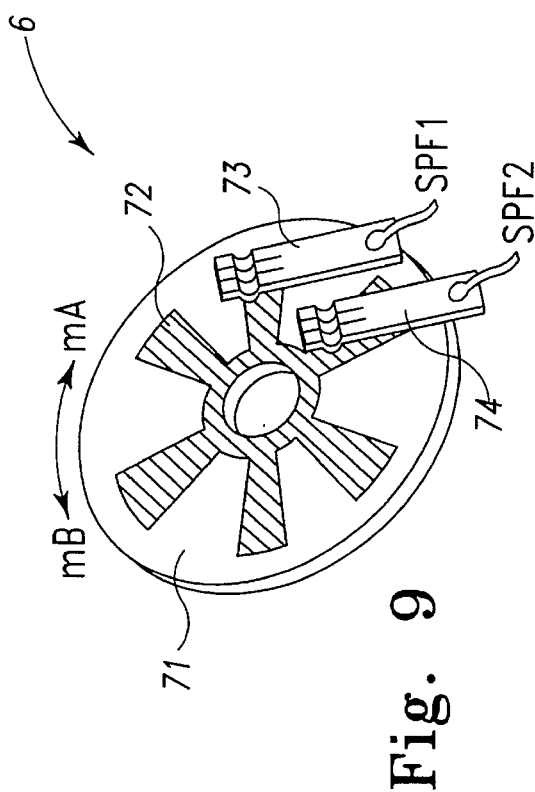
Fig. 9
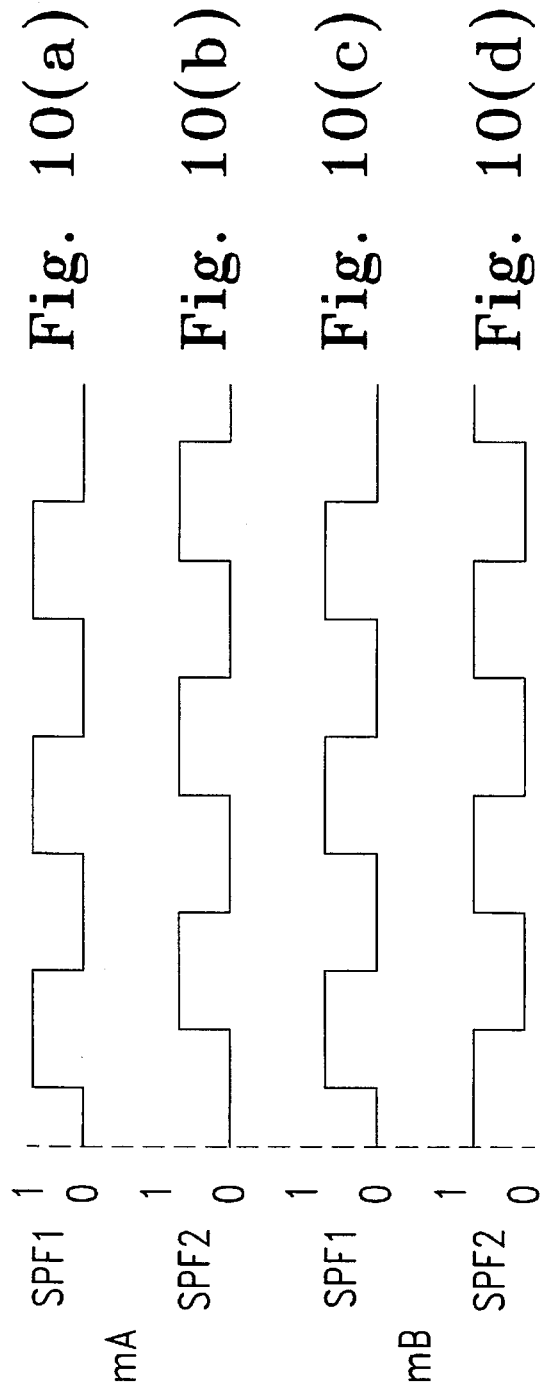
Fig. 10(a)
Fig. 10(b)
Fig. 10(c)
Fig. 10(d)

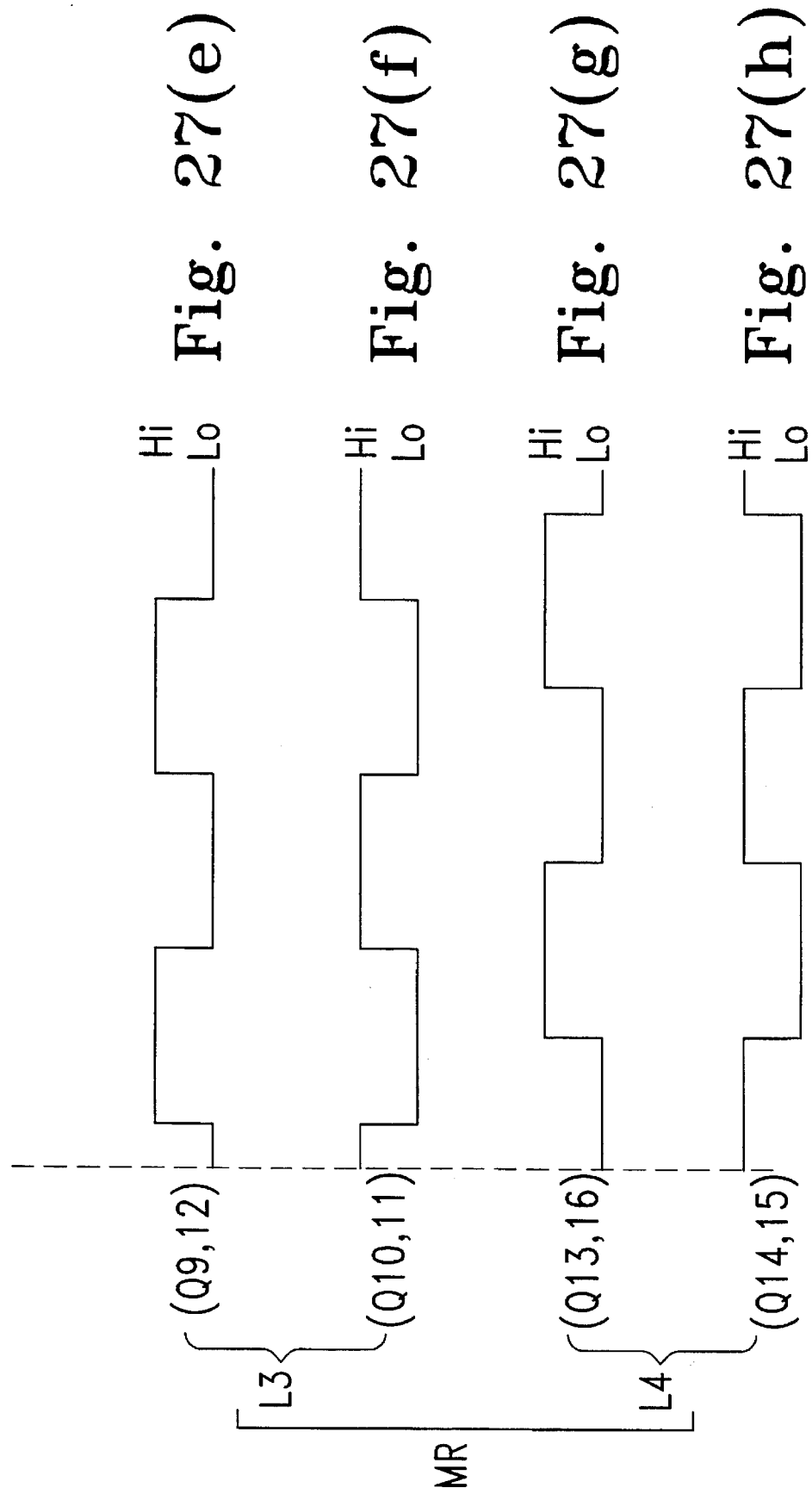

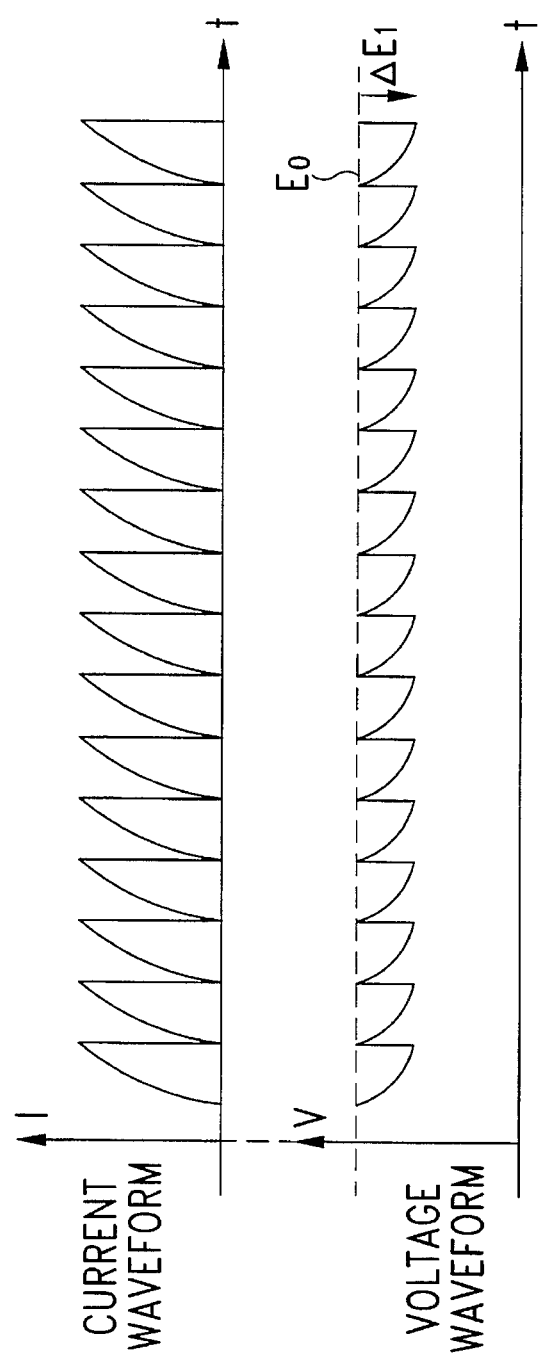
Fig. 28(a) CURRENT WAVEFORM
Fig. 28(b) VOLTAGE WAVEFORM

TELESCOPE HAVING MECHANISM FOR AUTOMATICALLY RETURNING OPTICAL SYSTEM TO A REFERENCE DIOPTRIC POWER

BACKGROUND OF THE INVENTION

1. Field of the Invention

The present invention relates to a telescope, and more specifically, to a telescope such as a binocular and a monocle.

2. Description of the Prior Art

When a user of a binocular is emmetropic (has normal vision) or wears glasses or contact lenses, it is unnecessary to adjust the dioptric power of the binocular if it is set to 0. In other cases, however, it is necessary to adjust the dioptric power.

In a general binocular where focusing and dioptric power adjustment are performed by manual operations, focusing is performed by objective lenses in both of the left and right lens barrels. The difference between the left and right dioptric powers is corrected by moving either of the left and right objective lenses (or eyepieces) based on an index, representative of a dioptric power of 0, of a dioptric scale provided at a dioptric power adjusting mechanism. Therefore, in the above-mentioned case, the dioptric power is set to 0 by setting the dioptric power adjusting mechanism at the index representative of a dioptric power of 0.

On the contrary, in a binocular where focusing and dioptric power adjustment are performed by driving a focusing lens included in the objective lens by a motor (e.g. a binocular where automatic focusing is performed), it is necessary to adjust both of the left and right dioptric powers.

For example, according to a prior art disclosed by the present applicant in Japanese Patent Application No. H3-185711, a plurality of dioptric powers manually set by the user can be stored in a memory, so that even if the dioptric power is changed, the focusing lens can be set again at the positions corresponding to the stored dioptric powers. However, unless the user stores a dioptric power of 0 in advance, it is impossible to automatically set the focusing lens to the position corresponding to a dioptric power of 0.

Moreover, in apparatuses as disclosed in Japanese Laid-open Patent Applications Nos. S63-206731 and H3-313355 where the dioptric power is automatically sensed and automatically corrected, it is necessary to provide a sensor. This increases the cost and size. Furthermore, when the user of the binocular has normal vision or wears glasses or contact lenses, since it is unnecessary to adjust the dioptric power, an incorrect dioptric power may be sensed. In view of this, setting the dioptric power to 0 is more desirable than automatically adjusting it to the sensed dioptric power.

According to the above-described binocular where the dioptric power adjustment and focusing are manually performed, firstly, it is impossible to find the position corresponding to a dioptric power of 0 while viewing through the binocular. This is because it is impossible to see the index provided at the dioptric power adjusting mechanism while viewing through the binocular. Secondly, since the accommodation range of the human eye is wide, it requires a skill to correctly adjust the dioptric power to meet the user's own dioptric power without seeing the index. This is because the user loses his or her dioptric power in the course of the dioptric power adjustment. If the user is young, it will be particularly difficult to correctly adjust the dioptric power without the index since his or her eye accommodation range is wider. The use of a binocular without the dioptric power being correctly adjusted causes eye fatigue.

Moreover, in the binocular where focusing and dioptric power adjustment are performed by motor driving, to provide the index for dioptric power adjustment at the dioptric power adjusting mechanism, a mechanism such as a motor for driving the lens and the circuit for electrically detecting the position of the index are necessarily provided in both of the left and right barrels. This increases the cost. Therefore, it is difficult to provide the index in such a binocular.

In the binocular where automatic focusing is performed, since in-focus condition is automatically obtained, the binocular is brought into in-focus condition irrespective of the user's dioptric power. For this reason, even if the user's dioptric power is not 0, the user can get a view which is in focus to some extent.

In this condition, although a slightly out-of-focus image should be gotten intrinsically, in-focus condition is forcibly and unconsciously obtained because of the accommodating capability of the human eye. For this reason, the user, who gets an in-focus view, neglects adjusting the dioptric power. Then, the user will continue the observation with the burden of the eyes, so that the eyes will become fatigued if the observation continues for a long time, which is not desirable. Therefore, it is desirable that the dioptric power adjustment position can be set to 0 before the observation so that the dioptric power is adjusted to the condition suitable for the user.

In an automatic focusing bibocular, it is inconvenient that movable parts for AF are exposed outside. Therefore, it is desirable to provide the movable parts inside the body. Then, the index representative of a dioptric power of 0 cannot be provided, so that it is difficult to make the above-mentioned dioptric power adjustment.

SUMMARY OF THE INVENTION

An object of the present invention is to provide a telescope where an initial dioptric power position is rapidly and easily set at the position corresponding to a dioptric power of 0 while viewing an object.

To achieve the above-mentioned object, a telescope of the present invention is provided with an optical system, a dioptric power adjusting mechanism for driving the optical system to adjust a dioptric power, a driving source which drives the dioptric power adjusting mechanism, a specifying member which specifies a position of the optical system corresponding to a predetermined reference dioptric power, and a controller which controls the dioptric power adjusting mechanism so that the optical system is driven to a reference position specified by the specifying member.

BRIEF DESCRIPTION OF THE DRAWINGS

This and other objects and features of this invention will become clear from the following description, taken in conjunction with the preferred embodiments with reference to the accompanied drawings in which:

FIG. 9 is a plan view showing the schematic arrangement of a relevant portion of a manual focusing dial constituting the embodiment of the present invention;

FIG. 10 is a time chart showing signals generated by the manual focusing dial constituting the embodiment of the present invention;

FIG. 28 is a time chart showing the current and voltage waveforms of the motor driving timing of the embodiment of the present invention;

DESCRIPTION OF THE PREFERRED EMBODIMENTS

Hereinafter, a binocular according to an embodiment of the present invention will be described with reference to the drawings. While the present invention is employed for a binocular in this embodiment, the present invention is not limited thereto; it may be employed for other kinds of telescopes.

Figure 3:
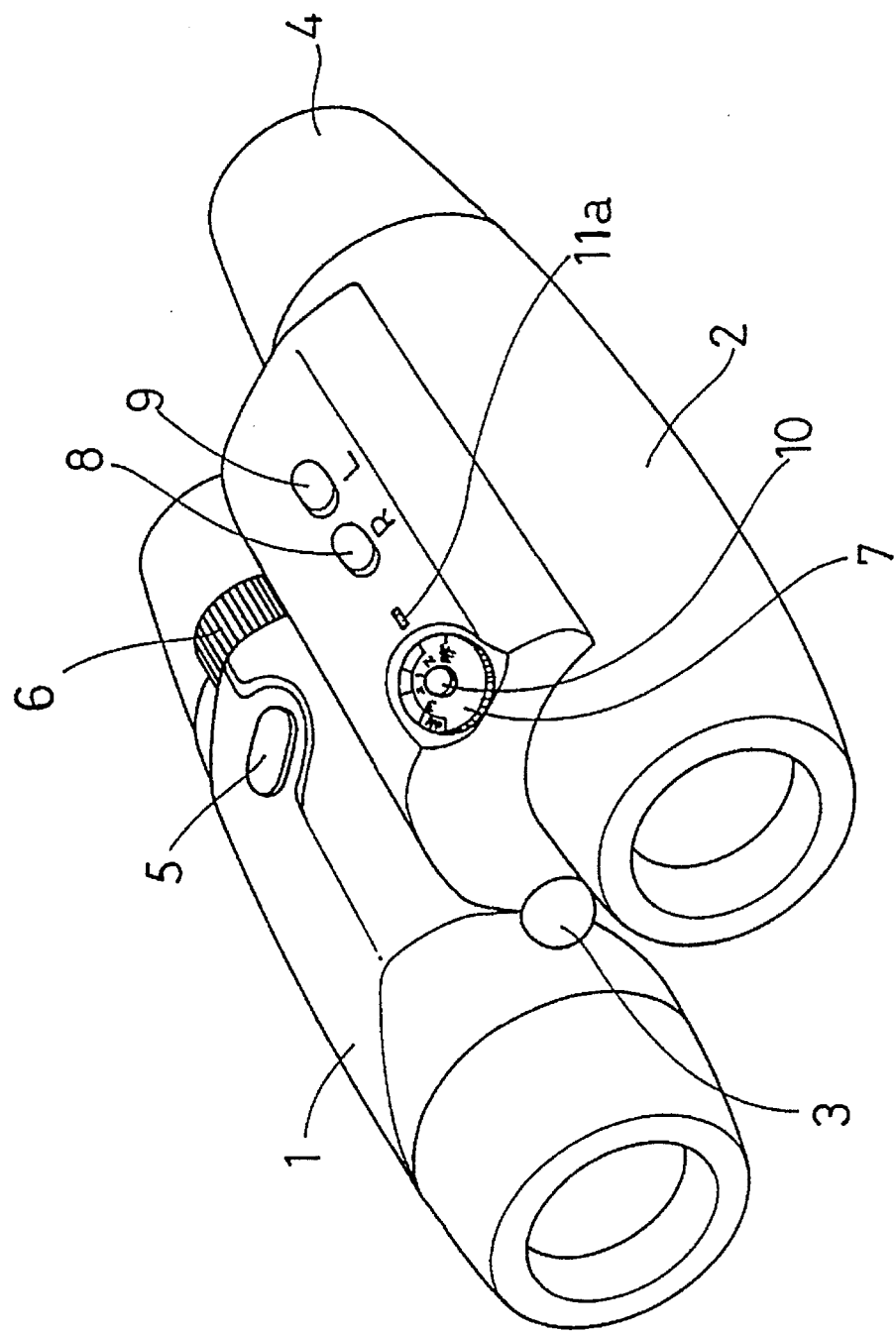
FIG. 3 is an external perspective view of an embodiment of the present invention.

First, an operation portion of this embodiment will be described. Referring to FIG. 3, there is shown a perspective view of an automatic focusing binocular (hereinafter referred to as AF binocular) according to this embodiment viewed from the object side. The AF binocular includes a right lens barrel 1 provided with an image forming optical system for the right eye and a left lens barrel 2 provided with an image forming optical system for the left eye. The AF binocular is doubled up at a pupil distance axis 3 between the right and left lens barrels 1 and 2.

The automatic focusing (AF) operation is performed by operating an AF button 5. When the AF button 5 is depressed, a focusing lens FL (FIGS. 33 to 35) provided in each of the right and left lens barrels 1 and 2 is moved to a position in accordance with a focus detection result obtained by a subsequently-described focusing module 331 (FIG. 4) to obtain in-focus condition. When in-focus condition is not obtained by automatic focusing, the focusing lens FL of each of the right and left lens barrels 1 and 2 is moved by operating the manual focusing dial 6 until in-focus condition is obtained.

The dioptric power adjusting operation is performed by a right dioptric power adjusting button 8 and a left dioptric power adjusting button 9. By rotating the manual focusing dial 6 while depressing the right dioptric power adjusting button 8, the focusing lens FL in the right lens barrel 1 is moved to a dioptric power position suitable for the dioptric power of the right eye. By rotating the manual focusing dial 6 while depressing the left dioptric power adjusting button 9, the focusing lens in the left lens barrel 2 is moved to a dioptric power position suitable for the dioptric power of the left eye.

The reason why the manual focusing dial 6 is used to perform the manual focusing and the dioptric power adjustment is that dials have excellent operability. It is needless to say that other operation member may be used.

Figure 33:
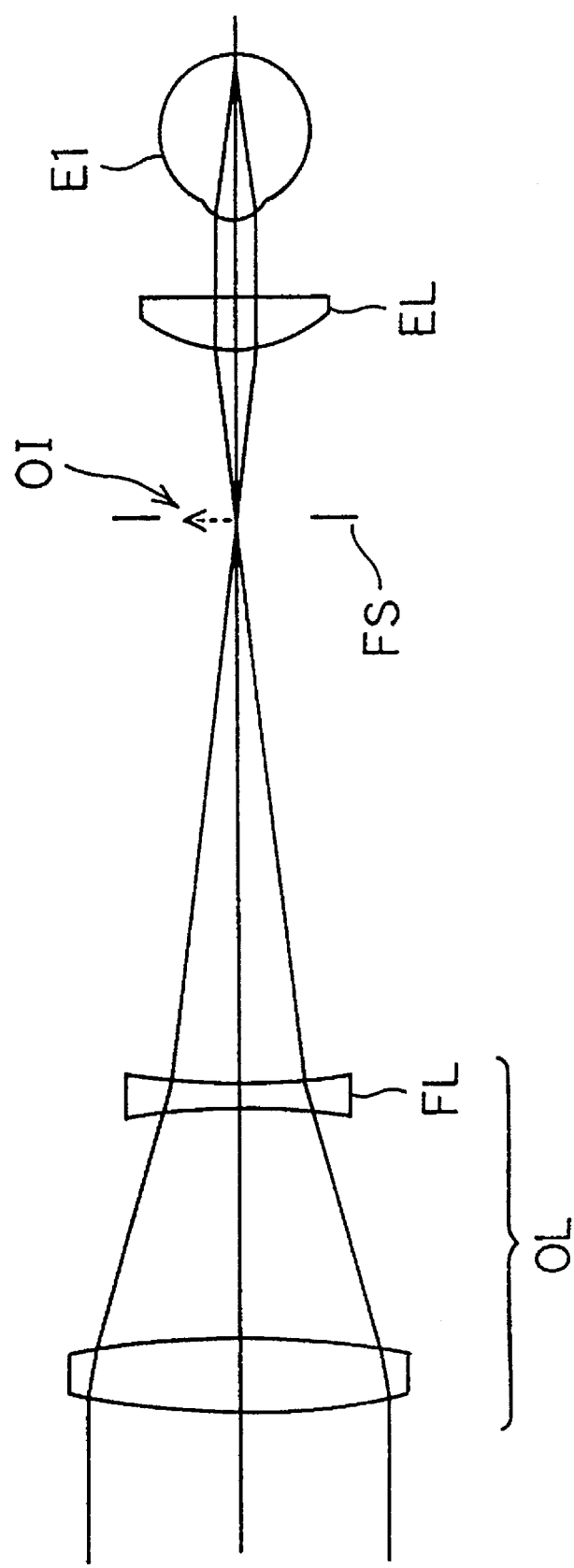
FIG. 33 is an optical path view showing a relationship between an emmetropic eye and the embodiment of the present invention.
Figure 34A:
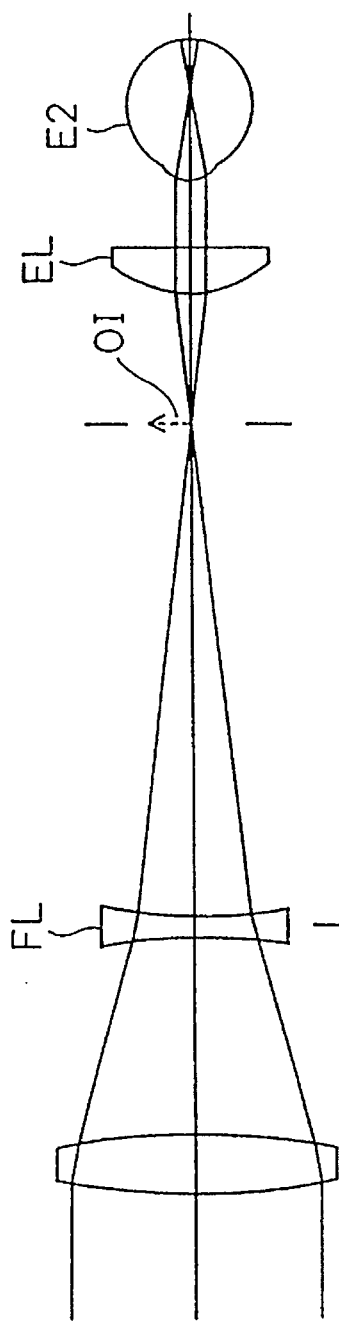
FIG. 34 is an optical path view showing a relationship between a myopic eye and the dioptric power adjustment of the embodiment of the present invention.
Figure 34B:
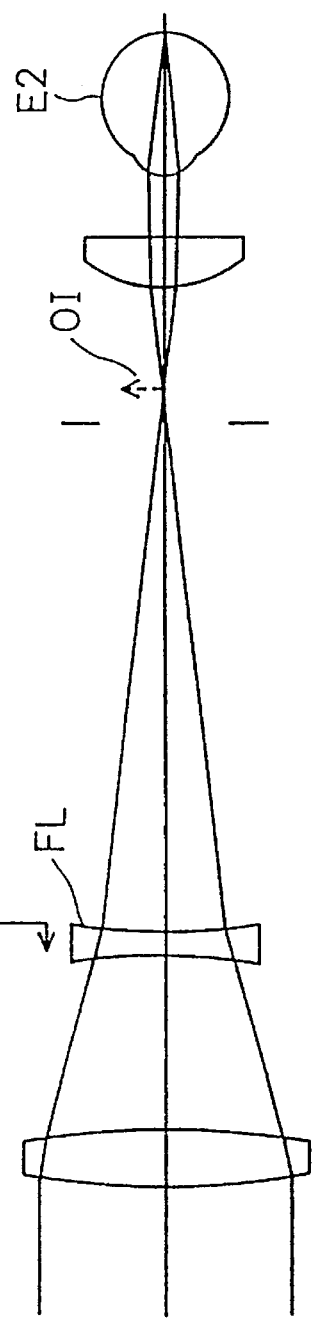
Figures 35A, 35B:
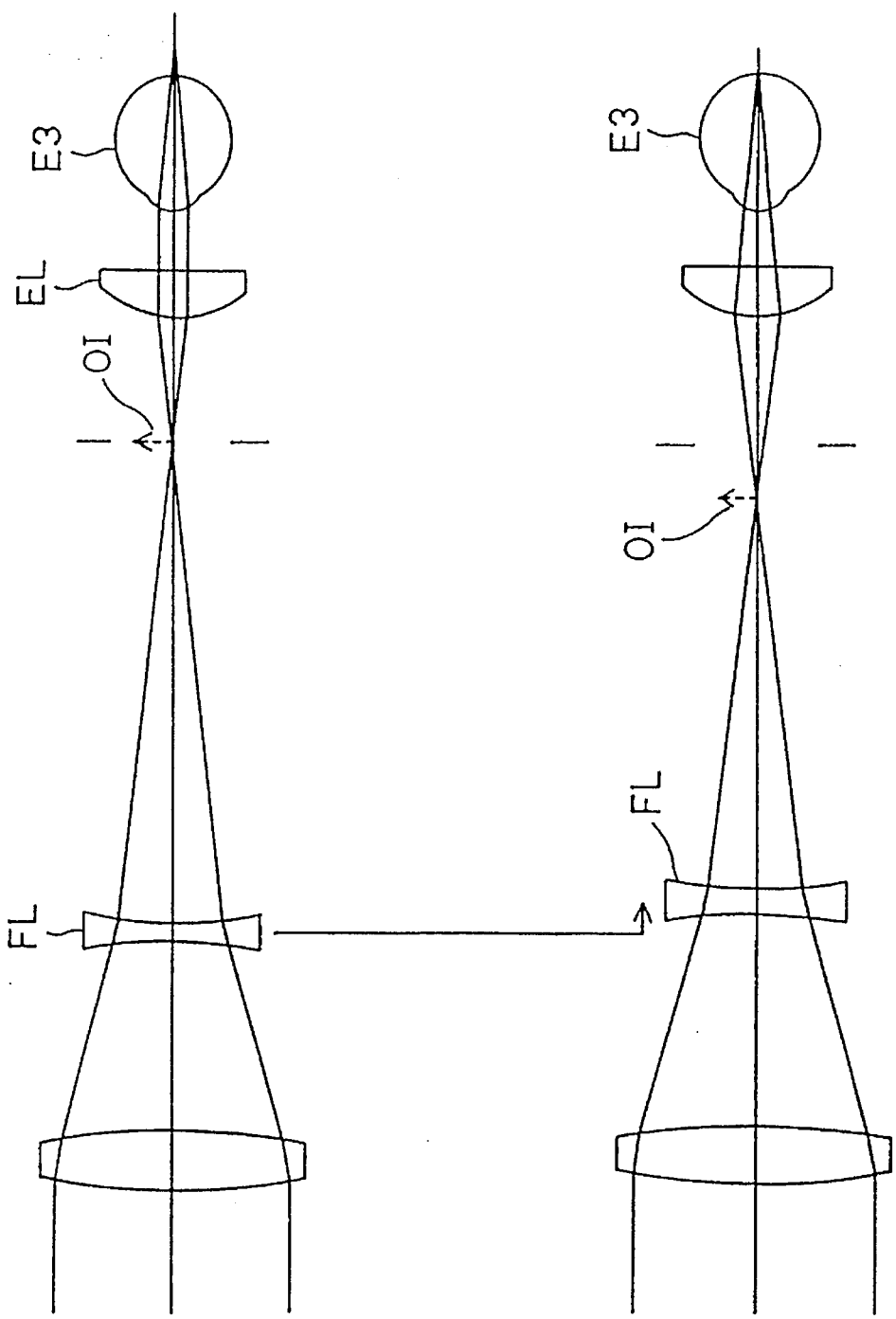
FIG. 35 is an optical path view showing a relationship between a hypermetropic eye and the dioptric power adjustment of the embodiment of the present invention.

As described above, the dioptric power is adjusted by moving the focusing lens FL. Referring now to FIGS. 29 to 35, the dioptric power adjusting mechanism will be described in further detail. The dioptric power is a degree of convergence or divergence of a luminous flux exiting from an eyepiece EL (FIGS. 33 to 35). Its unit of measure is diopter. The luminous flux exiting from the eyepiece EL is incident on the eye, and when a distance from the eye to a point at which the luminous flux is converged is L(m) (here, L is negative on the object side of the eye), the dioptric power D (diopter) is calculated by $D=1/L$. For example, the dioptric power D when a person is looking at an object located 1mm away from the person is D=1/1=−1 (diopter). The dioptric power D when a person is looking at an object at infinity (for example, a star) is D=1/∞=0 (diopter).

Figure 29:
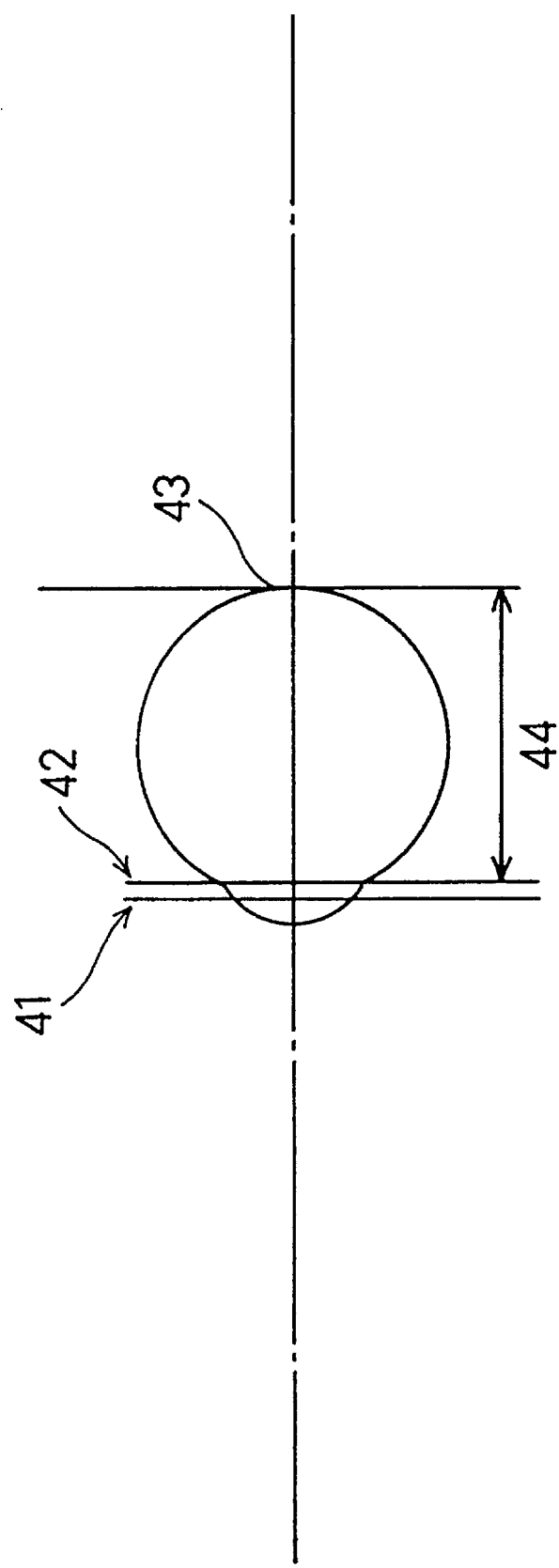
FIG. 29 schematically shows the cross-sectional structure of the eye ball.

The eye has a structure as shown in FIG. 29. Reference numeral 41 represents an object side principal point. Reference numeral 42 represents an image side principal point. Reference numeral 43 represents a retina. Reference numeral 44 represents an eye axis distance (distance from an image side principal point 42 of the eye optical system to the retina 43). The eyes are classified into three kinds according to their refraction condition: an emmetropic eye E1 (FIG. 30), a myopic (nearsighted) eye E2 (FIG. 31), and a hypermetropic (farsighted) eye E3 (FIG. 32).

Figure 30:
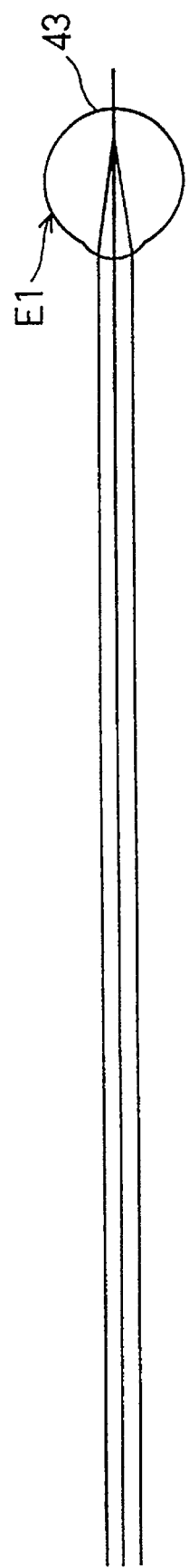
FIG. 30 shows the relationship between an emmetropic eye and a luminous flux incident on the emmetropic eye.

In the emmetropic eye E1, when an object is located at infinity, its luminous flux is a parallel luminous flux (D=0) as shown in FIG. 30, so that the luminous flux is converged on the retina 43 by the refractive power of the eye. In this case, the person having the emmetropic eye E1 sees the object located at infinity very well.

Figure 31:
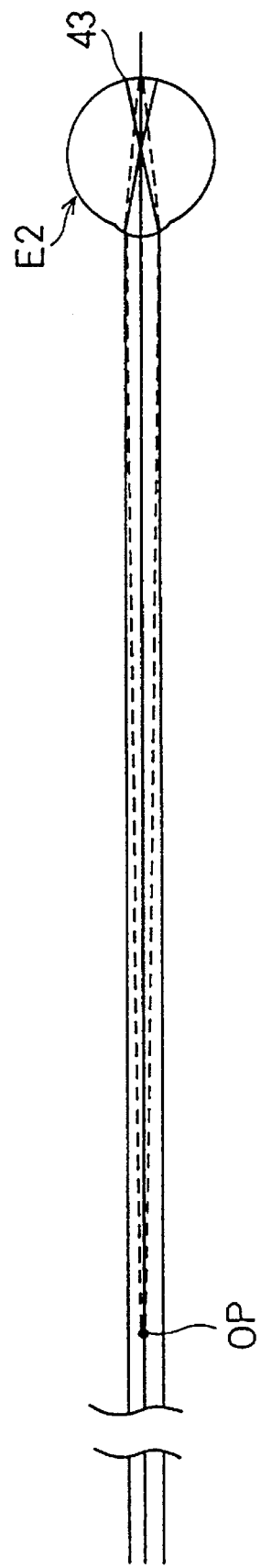
FIG. 31 shows a relationship between a myopic eye and a luminous flux incident on the myopic eye.

In the myopic eye E2, when an object is located at infinity, as shown by the solid lines of FIG. 31, the luminous flux is converged in front of (on the object side of) the retina 43 of the myopic eye E2 by the refractive power of the eye, and is divergent on the retina. This is caused by too strong refractive power of the eye or by too long eye axis distance 44. When an object point OP is closer to the eye, the luminous flux incident on the eye is divergent (dioptric power<0), so that the luminous flux is converged on the retina 43 (dotted lines in FIG. 31). In other words, in the myopic eye E2, the far point (in this case, the object point OP) is located in front of the eye at a finite distance away therefrom. Therefore, a person having the myopic eye E2 cannot see far objects and can only see near objects.

Figure 32:
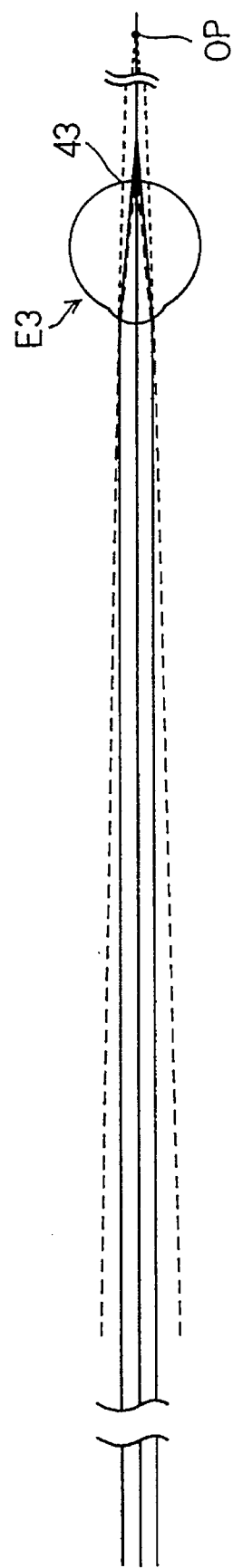
FIG. 32 shows a relationship between a hypermetropic eye and a luminous flux incident on the hypermetropic eye.

In the hypermetropic eye E3, when an object is located at infinity, as shown by the solid lines of FIG. 32, the luminous flux is converged behind the retina 43 by the refractive power of the eye, and is divergent on the retina 43. This is caused by too weak refractive power of the eye or by too short eye axis length 44. In the hypermetropic eye E3, by locating the object point OP behind the eye, the luminous flux incident on the eye is in a convergent condition (dioptric power>0), so that it is converged on the retina 43 (dotted lines of FIG. 32). In other words, in the hypermetropic eye E3, the far point (in this case, the object point OP) is located behind the eye. To create this condition, a convex lens (what is called, farsighted glasses) is placed in front of the eye E3.

In the present invention, the following is referred to as the dioptric power adjustment: by varying the condition (parallel, divergent and convergent) of the luminous flux incident on the eye, the condition where an object located at the same distance can be seen very well or cannot be seen according to the condition of the eye (the emmetropic eye E1, the myopic eye E2 and hypermetropic eye E3) is adjusted to a condition where the object can be seen very well irrespective of the condition of the eye.

Referring to FIG. 33, there is shown a condition where a user of the AF binocular of this embodiment which has the emmetropic eye E1 sees an object located at infinity through the AF binocular. For simplicity, an erecting prism is not shown. The object is located at infinity, and a luminous flux exiting from a point on the object is incident on an objective lens OL as a parallel luminous flux. The light is converged by the objective lens OL at the position of an aperture stop FS to form an object image OI (shown by the dotted arrow). Thereafter, the light is incident on the eyepiece EL while diverging, and is formed into a parallel luminous flux again and incident on the eye (emmetropic eye E1). The parallel luminous flux incident on the emmetropic eye E1 is converged at the retina 43 as described above, so that the user can see the image OI very well.

Referring to (a) of FIG. 34, there is shown a condition where a user who has the myopic eye E2 see an object located at infinity through the AF binocular. The position of the object and the positions of the optical elements are the same as those of FIG. 33. Since the parallel luminous flux incident on the eye (myopic eye E2) is divergent on the retina 43 (FIG. 29) as described above, an blurred image OI is seen by the user. To make the light converge on the retina 43 in the myopic eye E2, the divergent luminous flux is made incident on the eye. To do so, the position of the object image OI (the dotted arrow) is moved from the position of FIG. 33 or (a) of FIG. 34 to a position closer to the eyepiece EL as shown in (b) of FIG. 34.

As shown in (a) of FIG. 34, in this embodiment, the objective lens OL includes a stationary lens unit having a positive refractive power and a focusing lens unit FL having a negative refractive power. The eyepiece EL is also stationary. That is, both the dioptric power adjustment and the focusing are performed by moving only the focusing lens FL. With this arrangement, a mechanism for moving the optical system is simplified, so that the operability improves.

Since the objective lens OL employs a telephoto-type inner focusing method, the distance to the object does not differ between before and after the dioptric power adjustment (see FIG. 34). Therefore, to locate the image OI closer to the eyepiece EL as described above, the focusing lens FL is moved toward the object side as shown in (b) of FIG. 34. When the objective lens OL employs an entire lens system moving out method, the objective lens OL is moved in a direction opposite to the object (i.e. toward the eyepiece EL). When the eyepiece EL is movable, the eyepiece EL may be moved toward the image side.

Referring to (a) of FIG. 35, there is shown a condition where a user who has the hypermetropic eye E3 sees an object located at infinity through the AF binocular. Since the hypermetropic eye E3 is in a condition opposite to that of the myopic eye E2, the luminous flux is converged on the retina 43 by moving the focusing lens FL toward the eye as shown in (b) of FIG. 35.

As described above, since the optical system is constituted by the objective lens OL and the eyepiece EL and the dioptric power adjustment is made by the focusing lens FL constituted by the objective lens OL or a part thereof, the automatic focusing and the dioptric power adjustment can be performed by driving the same optical system. As a result, the structure of the binocular is simplified.

Returning to FIG. 3, the description of the operation portion will be continued. A main switch dial 7 has an OFF position and four other positions: a normal position N, a dioptric power memory 1, a dioptric power memory 2 and a dioptric power memory 3. When the main switch dial 7 is set at the OFF position, the power is deactivated, so that the AF binocular is inoperable. When the main switch dial 7 is set at other positions, the power is activated, so that the AF binocular is operable.

When the main switch dial 7 is set at the normal position N, the dioptric powers of the right and left lens barrels 1 and 2 are both set to 0. That is, as described above, the binocular is set so that a sharp image is formed on the retina 43 for the emmetropic eye E1.

The dioptric power memory 1, the dioptric power memory 2 and the dioptric power memory 3 are positions for storing dioptric powers adjusted by the user. When the main switch dial 7 is set at the dioptric power memory 1 or the dioptric power memory 2 or the dioptric power memory 3, the dioptric power is adjusted to a value stored in the position. For example, when the main switch dial 7 is set at the dioptric power memory 1 and the dioptric power adjustment is performed by the above-described operation and thereafter a dioptric power memory button 10 is depressed, the dioptric power adjustment amount is stored in the dioptric power memory 1. Even if the binocular is operated at other positions, when the main switch dial 7 is set at the dioptric power memory 1 again, the dioptric power adjustment amount is set to a value stored in the dioptric power memory 1.

A rubber portion 4 which directly abuts the periphery of the eye is made of an elastic material such as a rubber material. The rubber portion 4 is slidable toward the optical axis so that the user can see a clear image whether he or she wears glasses or not. Reference designation 11a represents a light emitting diode (LED) used for displaying a low battery warning. The LED 11a is also used as an index showing the set positions of the main switch dial 7. Within a non-illustrated field of the binocular and in the vicinity thereof, a subsequently-described LED 11b (see FIG. 8) is used for providing an in-focus display, a warning showing that focus detection is impossible (i.e. the contrast is low) and a warning showing that the dioptric power memory operation is performed at the normal position.

Figure 4:
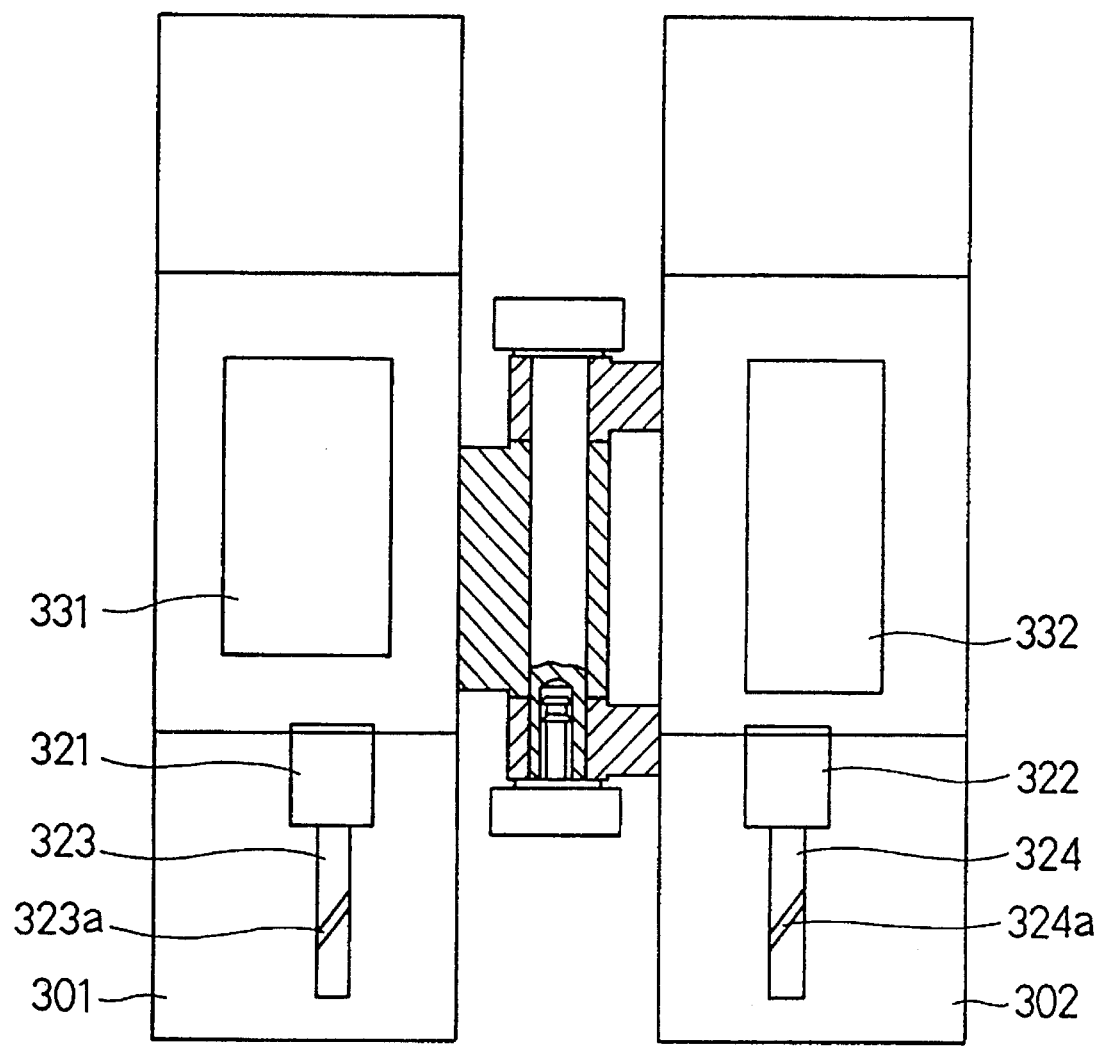
FIG. 4 is a plan perspective diagram of the embodiment of the present invention.
Figure 5:
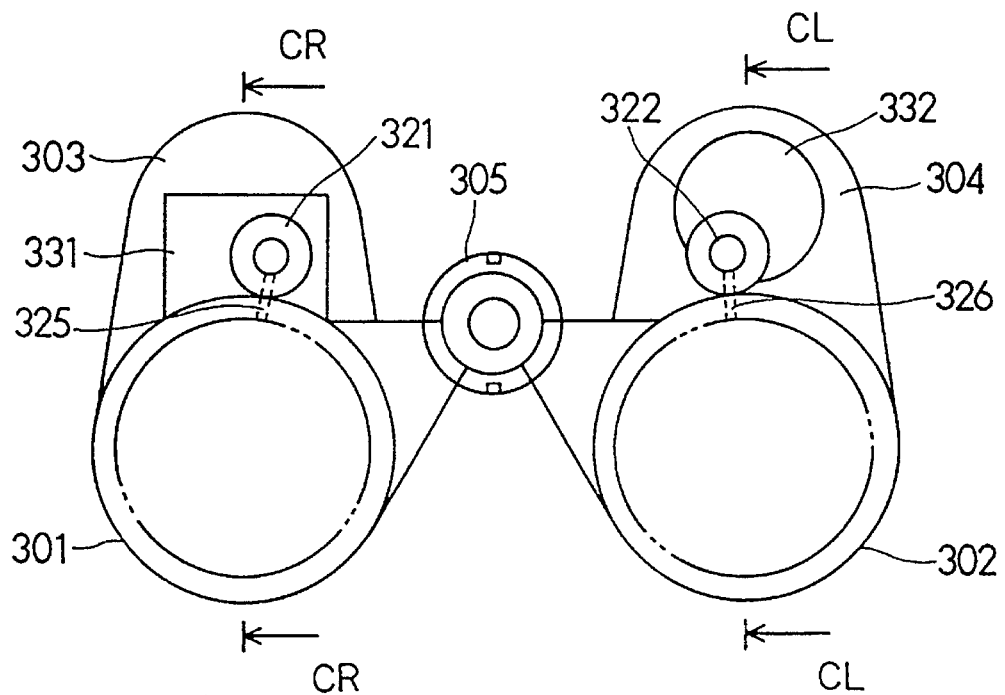
FIG. 5 is a front view of the embodiment of the present invention.
Figure 6:
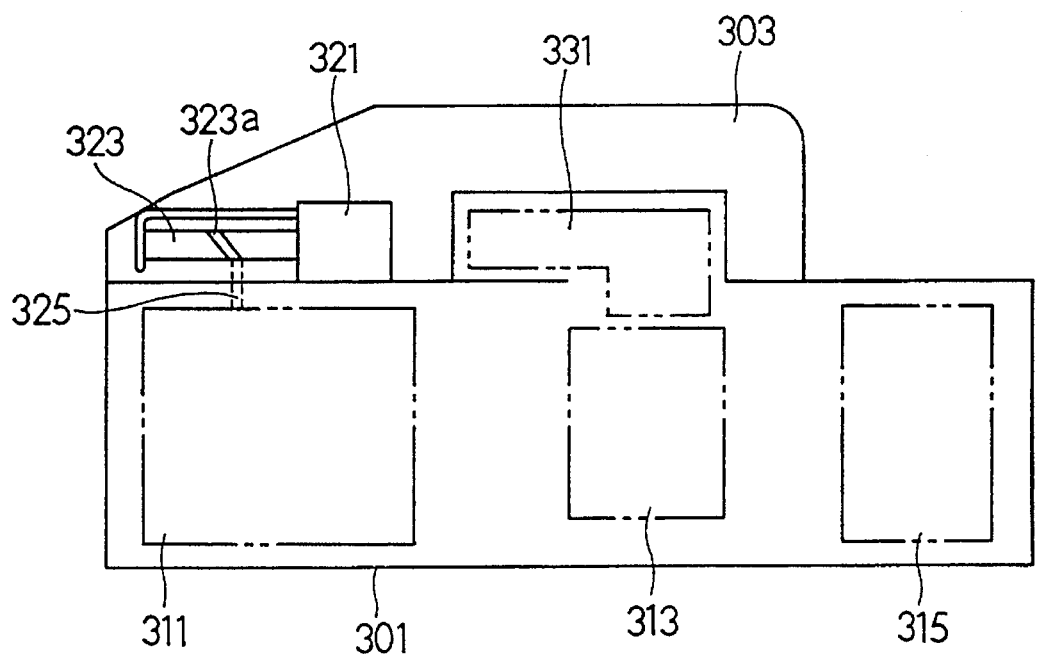
FIG. 6 is a cross-sectional view taken on the line CR—CR of FIG. 5.
Figure 7:
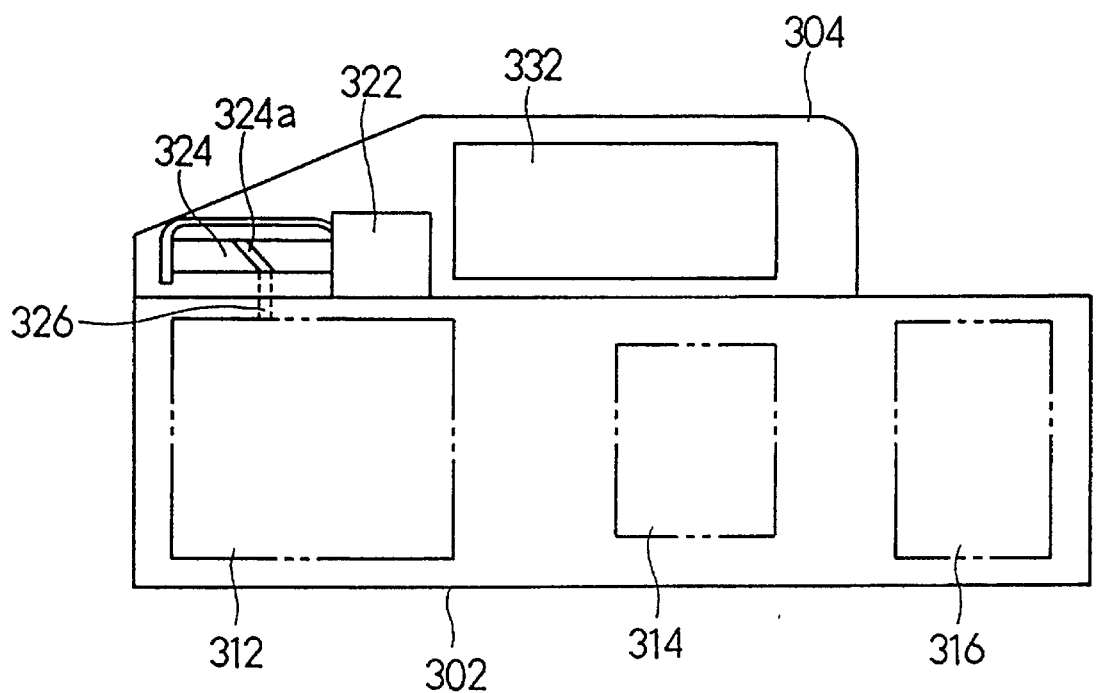
FIG. 7 is a cross-sectional view taken on the line CL—CL of FIG. 5.

Referring to FIGS. 4 to 7, the internal structure of this embodiment will be described. FIG. 4 is a plan perspective view of this embodiment. FIG. 5 is a front perspective view thereof. FIG. 6 is a perspective view (cross-sectional view taken on the line CR—CR of FIG. 5) of the right lens barrel 1. FIG. 7 is a perspective view (cross-sectional view taken on the line CL—CL of FIG. 5) of the left lens barrel 2.

Reference numerals 301 and 302 represent a right lens barrel and a left lens barrel each including a subsequently-described optical system. Reference numerals 303 and 304 represent upper covers of the right and left lens barrels 301 and 302. The upper covers 303 and 304 are made of synthetic resin. The upper cover 303 covers a focusing (AF) module 331, an AF motor 321 and a circuit board (not shown). The upper cover 304 covers a battery cavity 332 in which a battery 600 (FIG. 8) is housed, an AF motor 322 and a circuit board (not shown). In addition, on the upper cover 303, operation members such as the AF button 5 and the manual focusing dial 6 are arranged, and on the upper cover 304, an operation member such as the main switch dial 7 are arranged. The focusing module 331 provided in the right lens barrel 1 and the battery cavity 332 provided in the left lens barrel 2 are each arranged in a rear portion of a subsequently-described driving mechanism so as to be substantially symmetric with respect to each other.

The right lens barrel 1 and the left lens barrel 2 are rotatably connected by a hinge 305 constituted by the lens barrels 301 and 302 and the pupil distance axis 3 (FIG. 3), and are arranged on the right and left of the pupil distance axis 3 so that the adjustment may be made by increasing and decreasing the distance therebetween. The electrical connection of the right and left lens barrels 1 and 2 are made by a non-illustrated connecting member in the vicinity of the hinge 305.

In the right lens barrel 301, an objective lens 311 (corresponding to the objective lens OL of FIGS. 33 to 35) is arranged in the front portion thereof as shown in FIG. 6. A prism 313 is arranged in the middle portion thereof, and the eyepiece 315 (corresponding to the eyepiece EL of FIGS. 33 to 35) is arranged in the rear portion thereof.

In the left lens barrel 302, an objective lens 312 (corresponding to the objective lens OL of FIGS. 33 to 35) is arranged in the front portion thereof as shown in FIG. 7. A prism 314 is arranged in the middle portion thereof. An eyepiece 316 (corresponding to the eyepiece EL of FIGS. 33 to 35) is arranged in the rear portion thereof.

Focusing lenses (corresponding to the focusing lens FL of FIGS. 33 to 35) of the objective lenses 311 and 322 are movable in the lens barrels 301 and 302 along the optical axis. They move simultaneously with each other in the automatic focusing and independently of each other in the dioptric power adjustment.

Subsequently, the driving mechanism will be described. As shown in FIGS. 4, 6 and 7, in the lens barrels 301 and 302, the AF motors 321 and 322 and driving cam shafts 323 and 324 for driving the lenses are arranged around the objective lenses 311 and 312. The driving cam shafts 323 and 324 have cam grooves 323a and 324a which engage with pins 325 and 326 of focusing frames (not shown), respectively. When the driving cam shafts 323 and 324 are rotated by the rotation of the motors 321 and 322, the objective lenses 311 and 312 move backward and forward. Further, the lens barrels 1 and 2 each have a pair of springy strips (not shown). The pairs of strips constitute switch strips for sensing the driving end by the driving system by coming in contact with each other when the pins 325 and 326 abut them.

The motors 321 and 322 are preferably stepping motors. However, they are not limited thereto. A speed reducing mechanism may be provided between the motors 321 and 322 and the driving cam shafts 323 and 324. While in this embodiment, the driving cam shafts 323 and 324 and the pins 325 and 326 engaging therewith are used to convert the rotary motions of the motors 321 and 322 into linear motions, for example a male screw and a female screw may be provided to the motor side and to the movement side, respectively, so that the rotation of the male screw is transmitted to the female screw which is prevented from rotating. Moreover, the female screw may comprise a rack.

Figure 8:
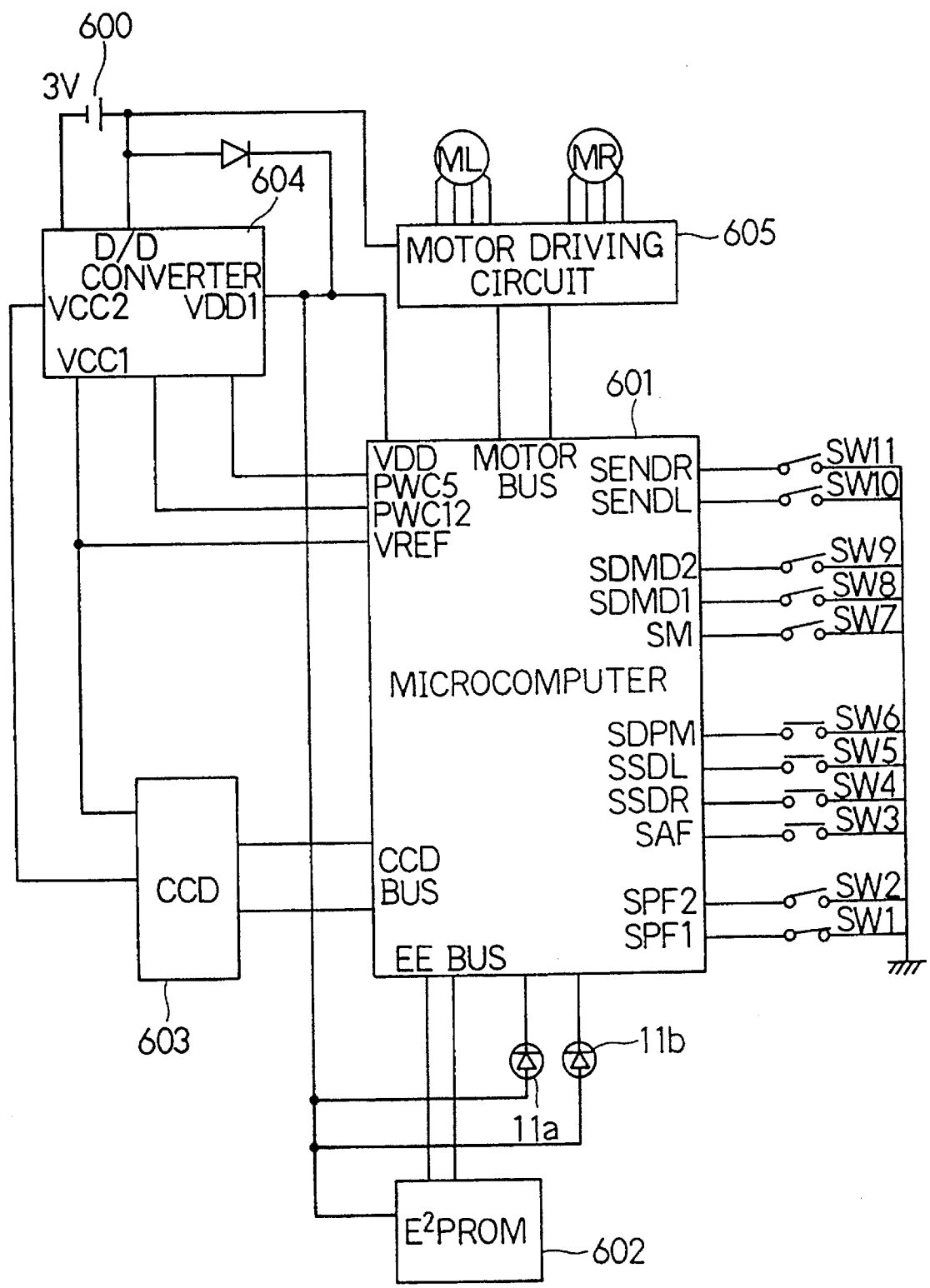
FIG. 8 is a block diagram showing the circuit arrangement of the embodiment of the present invention.

Referring now to FIG. 8, the arrangement of the entire circuit of this embodiment will be described. Reference numeral 601 represents a microcomputer which controls the entire circuit. To the microcomputer 601, eleven switches are connected as shown in the figure.

SW7 represents a switch interlocking with the main switch dial 7. The switch SW7 is connected to a terminal SM, and is open when the main switch dial 7 is at the OFF position and is closed when the main switch dial 7 is at positions other than the OFF position. SW3 represents a switch interlocking with the AF button 5. The switch SW3 is connected to a terminal SAF, and is closed when the AF button 5 is operated.

SW1 and SW2 represent switches interlocking with the manual focusing dial 6. The switches SW1 and SW2 are connected to terminals SPF1 and SPF2, respectively, and are turned on and off according to the rotation of the manual focusing dial 6. As described later, the rotation direction of the manual focusing dial 6 is detected based on the ON/OFF phases of the terminals SPF1 and SPF2.

SW4 represents a switch interlocking with the right dioptric power adjusting button 8. The switch SW4 is connected to a terminal SSDR. SW5 represents a switch interlocking with the left dioptric power adjusting button 9. The switch SW5 is connected to a terminal SSDL. The switches SW4 and SW5 are closed when the right dioptric power adjusting button 8 and the left dioptric power adjusting button 9 are operated, respectively. SW6 represents a switch interlocking with the dioptric power memory button 10. The switch SW6 is connected to a terminal SDPM, and is closed when the dioptric power memory button 10 is operated.

SW8 and SW9 are switches interlocking with the positions of the main switch dial 7. The switches SW8 and SW9 are connected to terminals SDMD1 and SDMD2, respectively. The ON/OFF conditions of the switches SW8 and SW9 depend on the positions of the main switch dial 7 as described later.

SW11 represents a switch showing a reference position of the focusing lens FL (FIGS. 33 to 35) of the right lens barrel 1. SW10 represents a switch showing a reference position of the focusing lens FL of the left lens barrel 2. The switches SW11 and SW12 are constituted by the above-described pairs of springy strips for sensing the driving end, and are connected to terminals SENDR and SENDL, respectively.

Reference numeral 602 represents a memory which is electrically rewritable and maintains its contents even after the power is deactivated i.e. electrically erasable programmable read only memory (EEPROM). The memory 602 is connected to the microcomputer 602 by an electrically erasable bus (EE bus). Reference numeral 603 is a charge coupled device (CCD) used for focus detection. The CCD 603 is connected to the microcomputer 601 by a CCD bus.

Reference numeral 605 represents a motor driving circuit, which is connected to the microcomputer 601 by a motor bus. ML represents a stepping motor (corresponding to the above-described motor 322) for driving the focusing lens FL (FIGS. 33 to 35) of the left lens barrel 2. MR represents a stepping motor (corresponding to the above-described motor 321) for driving the focusing lens FL of the right lens barrel 1. Reference designation 11a represents the above-described LED for displaying a low battery warning. Reference designation 11b represents an LED provided within a non-illustrated field of the binocular or in the vicinity thereof (preferably, on a focal plane of the eyepiece EL) to provide an in-focus display, a warning showing that focus detection is impossible (i.e. the contrast is low) and a warning showing that the dioptric power memory operation is performed at the normal position.

Reference numeral 600 is a battery. Reference numeral 604 represents a DC to DC converter (hereinafter, referred to as "D/D converter") which increases the battery voltage of 3 volts to supply power to the microcomputer 601, the EEPROM 602 and the CCD 603. Analog power voltages VCC1 and VCC2 which are outputs of the D/D converter 604 are supplied to the microcomputer 601 and the CCD 603. A VDD1 of 5 volts which is a digital power source is supplied to the microcomputer 601, the EEPROM 602 and the LEDs 11a and 11b. The D/D converter 604 is controlled by signals outputted from terminals PWC5 and PWC12 of the microcomputer 601. When the level of the terminal PWC5 is changed to low, the voltage VDD1 is supplied. When the level is high, the voltage VDD1 is not supplied. Likewise, when the level of the terminal PWC12 is low, the voltages VCC1 and VCC2 are supplied. These voltages are not supplied when the level is high. When the microcomputer 601 operates on a low power consumption or sleeps, the levels of the terminals PWC5 and PWC12 are both changed to high so that the supply voltage (i.e. the voltage of the battery 600) is supplied to the microcomputer 601.

Referring now to FIG. 9, the structure of the manual focusing dial 6 will be described. Reference numeral 71 represents a base plate which rotates in synchronism with the manual focusing dial 6. Reference numeral 72 represents an encoder pattern provided on the base plate 71. The encoder pattern 72 is grounded. Reference numerals 73 and 74 represent strips connected to the terminals SPF1 and SPF2, respectively. They are pulled up to the level of the voltage VDD1.

FIG. 10 is a time chart showing the conditions of the terminals SPF1 and SPF2 which are varied by the rotation of the manual focusing dial 6. In this figure, the lateral axis represents time. When the manual focusing dial 6 is rotated in a clockwise direction mA or a counterclockwise direction mB of the base plate 71 shown in FIG. 9, the conditions of signals outputted from the terminals SPF1 and SPF2 vary as shown in FIG. 10. The rotation direction of the manual focus dial 6 (the clockwise direction mA or the counterclockwise direction mB) can be determined based on the phase of signals inputted to the terminals SPF1 and SPF2. Specifically, when the phase of a signal inputted to the terminal SPF1 is 90 degrees ahead of the phase of a signal inputted to the terminal SPF2, the rotation direction is the clockwise direction mA, and when the phase is 90 degrees behind, the direction is the counterclockwise direction mB.

Figure 11:
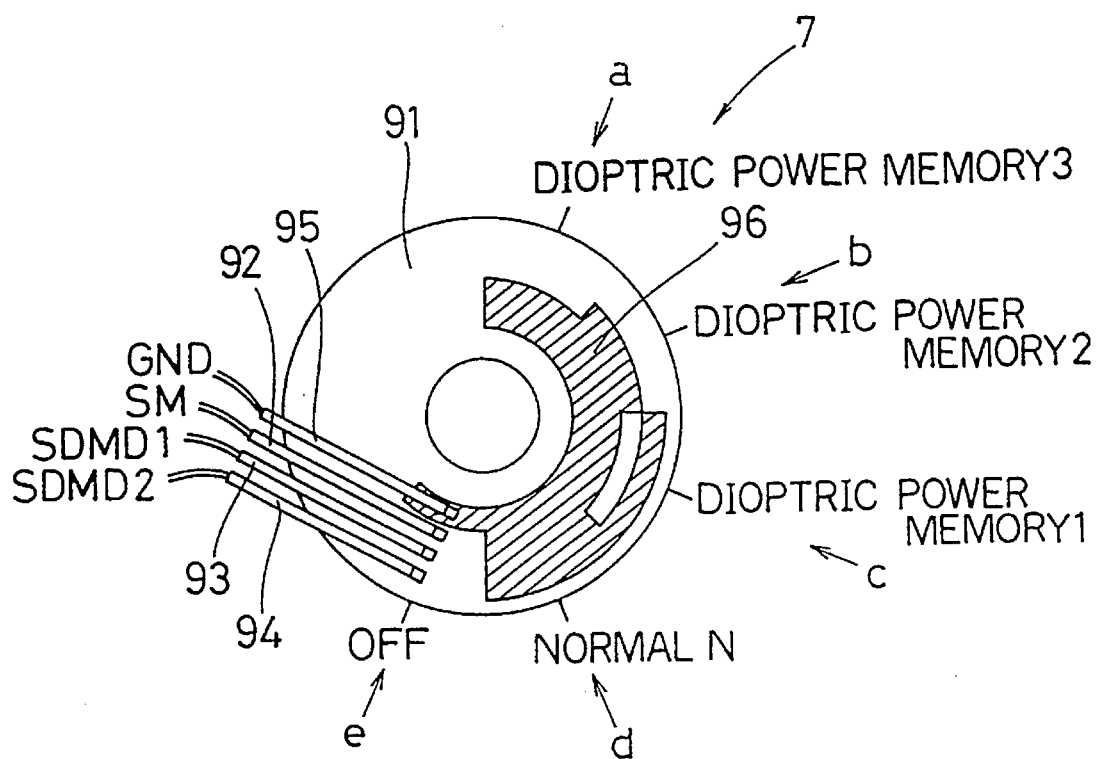
FIG. 11 is a plan view showing the schematic arrangement of a relevant portion of a main switch dial constituting the embodiment of the present invention.

Referring to FIG. 11, the structure of the main switch dial 7 will be described. Reference numeral 91 represents a base plate which rotates in response to an operation of the main switch dial 7. Reference numeral 92 is a strip connected to the terminal SM. Reference numerals 93 and 94 are strips connected to the terminals SDMD1 and SDMD2, respectively. Reference numeral 95 represents a strip connected to ground. Reference numeral 96 represents an electrode pattern corresponding to the strips 92, 93, 94 and 95. The electrode pattern 96 is in contact with the strip 95 to be at the ground potential in the entire rotation range between a and e. A click is provided at each of the dioptric positions a, b, c and d so that the rotation of the main switch dial 7 is stopped at each click.

The terminals SM, SDMD1 and SDMD2 are pulled up to the level of VDD1. When the position e on the base plate 91 rotates to the contacts of the strips 92 to 94, the levels at the terminals SM, SDMD1 and SDMD2 are 1, 1 and 1, respectively, which shows an OFF position. When the position d on the base plate 91 rotates to the contacts of the strips 92 to 94, the levels at the terminals SM, SDMD1 and SDMD2 are 0, 0 and 0, respectively, which shows a normal position N and that the power is ON. When the position c on the base plate 91 rotates to the contacts of the strips 92 to 94, the levels of the terminals SM, SDMD1 and SDMD2 are 0, 1 and 0, respectively, which shows a position of the dioptric power memory 1 and that the power is ON. Likewise, the positions a and b on the base plate 91 show the positions of the dioptric memory 3 and the dioptric memory 2, respectively. These are shown in Table 1. Thus, a specifying means for specifying the position of the focusing lens FL corresponding to a dioptric power of 0 is constituted by the elements constituting the main switch dial 7 and the switches SW8 and SW9.

One feature of the present invention is that a mode is provided in which the 0 dioptric power position can be set when a predetermined switch is turned on by an operation of the main switch dial 7. As described later, since the microcomputer 601 controls so that the focusing lens FL is set to a dioptric power of 0 when the main switch dial 7 is set at the normal position N, the user can rapidly and easily set the initial position corresponding to the dioptric power to 0.

As described previously, when the user has normal vision or wears glasses or contact lenses, fine adjustment of the dioptric power is unnecessary since the dioptric power has already been adjusted to 0 or close to 0. Therefore, it is advantageous to set the main switch dial 7 at the normal position N. Conventional binoculars have no mode to return the dioptric power to 0 since they have no index for dioptric power adjustment. However, the present invention is provided with such a mode.

As described previously, the driving means (such as the motors 321 and 322) are activated by operating operation members (i.e. the manual focusing dial 6 and the left and right dioptric power adjusting buttons 8 and 9). By this feature, even when the dioptric power is largely deviated, the dioptric power is immediately returned to the initial one, i.e. 0 by setting the main switch dial 7 at the normal position N. In this embodiment, the objective lens OL is used for both the focusing and the dioptric power adjustment. In either case, the objective lens OL is not driven mechanically by a manual operation but is driven by a motor.

As described above, the left and right dioptric powers of a user can be stored at each of the dioptric power memory position. As the specifying means for specifying the position of the focusing lens FL corresponding to a dioptric power of 0, a push switch may be used which is turned on to set the dioptric power to a dioptric power of 0.

Figure 12:
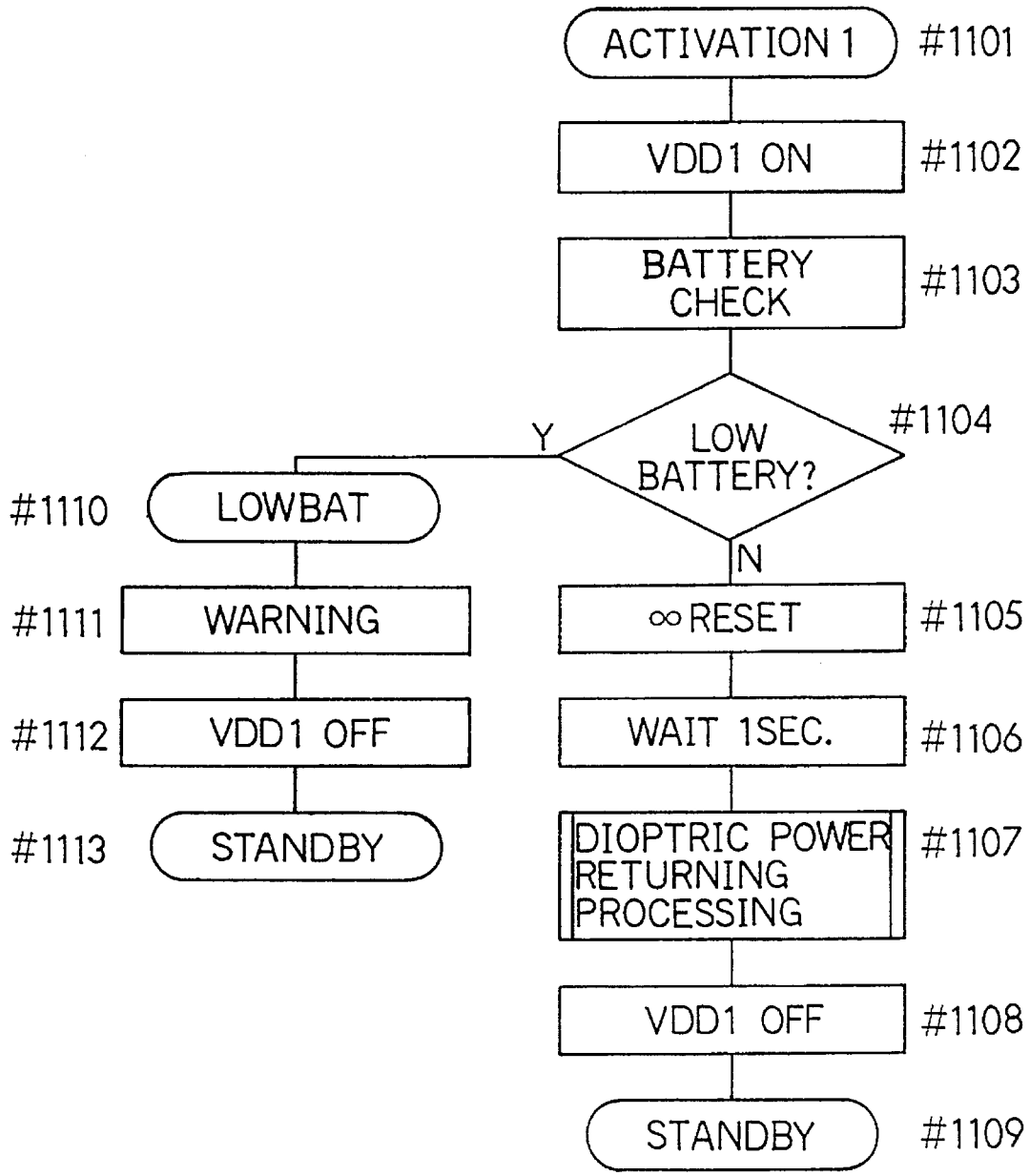
FIG. 12 is a flowchart of a general sequence (activation 1) of the embodiment of the present invention.

Referring now to the flowchart of a general sequence of FIG. 12, a control operation performed by the microcomputer 601 will be described. When the main switch dial 7 is turned from off to on (i.e. when the dial 7 is set at one of the four dioptric power positions), the switch SW7 connected to the terminal SM is closed. Thereby, the microcomputer 601 is brought from a sleep state (standby state 1) into a low power consumption operation mode to start a processing of activation 1 (#1101).

The sleep state (standby state 1) is a state in which the main switch dial 7 is OFF and the microcomputer is not functioning. Power is supplied to the microcomputer in this state. However, the power consumption is minimized. The low power consumption operation mode is a state in which the microcomputer is operating on a low-speed clock (the D/D converter 604 has not been activated yet). In this state, the microcomputer can operate on a low voltage (3 V). When no switch operation is performed for a predetermined period of time with the main switch dial 7 being ON, the microcomputer 601 is brought into a sleep state (standby state 2) to prevent power consumption. Unlike the standby state 1, in the standby state 2, since the microcomputer must be activated when other switches such as the AF switch SW3, the manual focusing switches SW1 and SW2 are operated, a timer interrupt is periodically applied so that the microcomputer periodically goes out of the sleep state to be activated. When the other switches are not operated, the microcomputer is returned to the sleep state. This operation is not performed when the main switch dial 7 is OFF. In the standby state 2, the conditions of the switches are periodically detected, so that the power consumption increases. The microcomputer 601 has a high-speed clock for a high-speed operation and a low-speed clock for a low-speed operation. Normally, the clock is operated at a high speed. In states other than the high-speed state (i.e. in the low power consumption state and in the sleep state), the generation of the high-speed clock is stopped by hardware, and only the low-speed clock is generated.

The terminal PWC5 is set at low level so that VDD1 is supplied from the D/D converter 604 (#1102). Thereby, the high-speed operation of the microcomputer 601 is enabled, and a battery check is made as to whether the voltage of the battery 600 is below a predetermined voltage or not (#1103). To make the battery check, the supply voltage is applied to a non-illustrated resistor and the voltage across the resistor is monitored.

When it is determined that the supply voltage is below the predetermined voltage in the determination (#1104) as to whether the voltage of the battery 600 is low or not, the process proceeds to a low battery warning processing (LOWBAT, #1110). In this process, first, the LED 11a is blinked to provide a warning (#1111). Then, the terminal PWC5 is set at high level, and after VDD1 is deactivated (#1112), the microcomputer 601 shifts to the standby state 1 (#1113), i.e. a state in which although the main switch is ON, the operations of the other switches are not accepted.

When it is determined at step #1104 that the voltage of the battery 600 is not low, an infinity resetting is performed (#1105). This is performed by driving the focusing lenses FL of the left and right lens barrels 2 and 1 (FIGS. 33 to 35) toward the infinity side and by driving the focusing lenses FL until the switches SW11 and SW10 connected to the terminals SENDR and SENDL are closed. Then, the process waits one second (#1106). This is in order to wait for the user to finish the operation to set a desired dioptric power position by operating the main switch dial 7.

Then, a dioptric power returning processing is performed to set the dioptric power to a dioptric power corresponding to the set dioptric power memory position (#1107). By this processing, the dioptric power is adjusted to a dioptric power stored in the selected dioptric power memory position. The dioptric power returning processing will be described later in detail with reference to FIG. 21. Then, the terminal PWC5 is set to high level to deactivate VDD1 (#1108), and the microcomputer 601 shifts to the standby state 2 (#1109).

Figure 13:
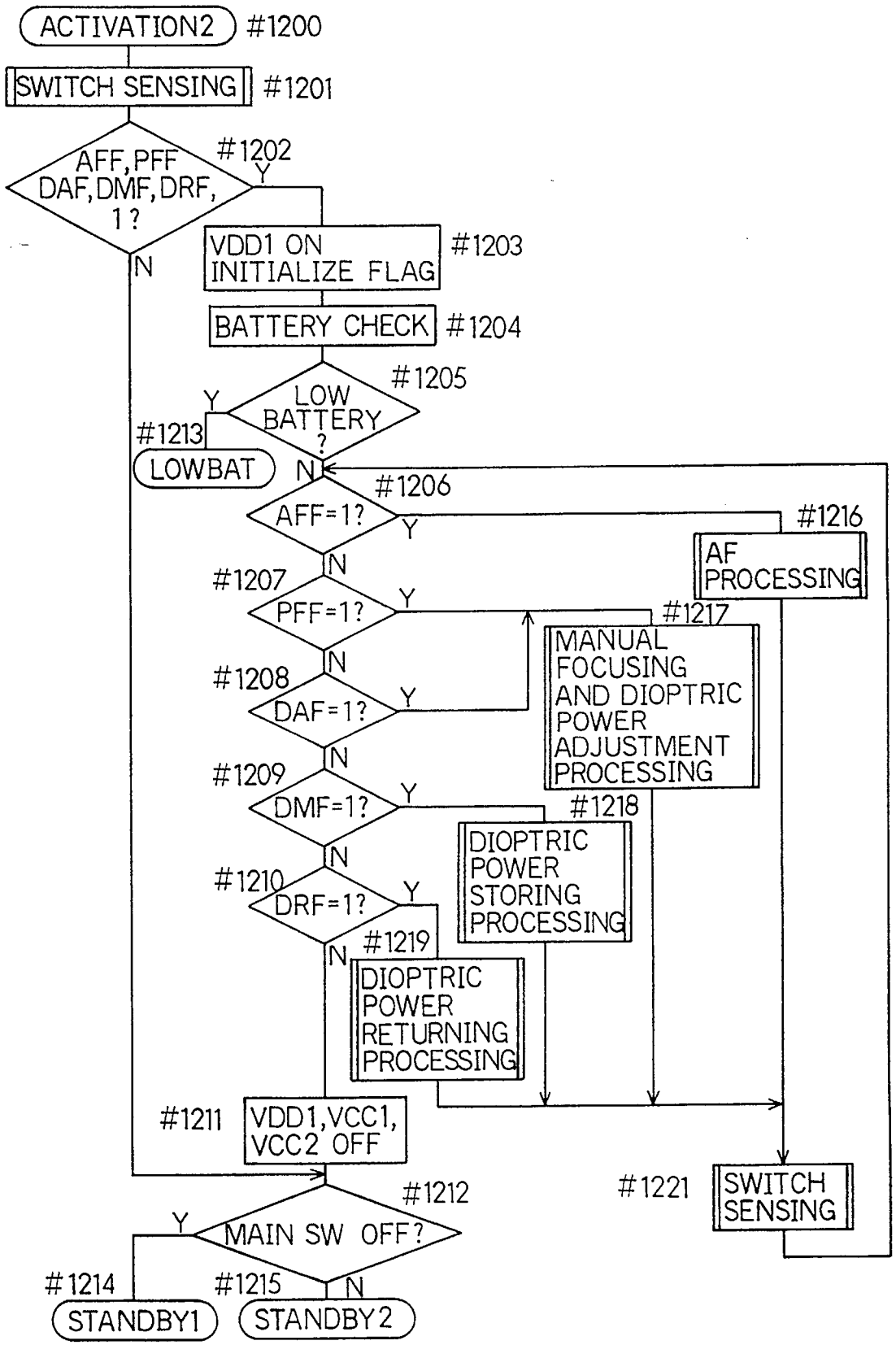
FIG. 13 is a flowchart of a general sequence (activation 2) of the embodiment of the present invention.

Referring to the flowchart of a general sequence of FIG. 13, a control operation performed by the microcomputer 601 will further be described. In the standby state 2, a processing of activation 2 (#1200) is executed every 50 milliseconds by a non-illustrated timer (this timer is provided in the microcomputer 601).

First, whether the switches have been operated or not is determined based on the conditions of the switches (switch sensing, #1201). The switch sensing is a subroutine in which whether the AF button 5, the manual focusing dial 6, the main switch dial 7, the left and right dioptric power adjusting buttons 9 and 8, and the dioptric power memory button 10 have been operated or not is determined, and flags AFF, PFF, DRF, DAF and DMF are set. The switch sensing will be described later in detail with reference to FIG. 14.

When it is determined at step #1202 that all the flags are 0 by the switch sensing (i.e. when no switches have been operated), whether the main switch SW7 is ON or OFF is determined (#1212). When the main switch SW7 is ON, the microcomputer 601 again shifts to the standby state 2 (#1215). When the main switch SW7 is OFF, the microcomputer 601 shifts to the standby state 1 (#1214). When the main switch SW7 is ON, the conditions of the switches are repeatedly detected every 50 milliseconds.

When it is determined at step #1202 that any of the switches has been operated, any of the flags AFF, PFF, DAF, DMF and DRF is 1, so that the process branches at step #1202 to set the voltage of the terminal PWC5 at low level to supply VDD1 and to initialize a flag to be used (#1203).

Then, the battery check is performed (#1204), and when it is determined at step #1205 that the voltage of the battery 600 is low, the process shifts to the routine of LOWBAT (step #1110 of FIG. 12) (#1213). When it is determined at step #1205 that the voltage of the battery is not low, whether the flag AFF showing the operation of the AF button 5 is 1 or not is determined (#1206).

When the flag AFF is 1, an automatic focusing (AF) processing is performed (#1216). The AF processing will be described later in detail with reference to FIG. 15. Then, the switch sensing of the switches is again performed (#1221). The switch sensing will be described later in detail with reference to FIG. 14. Then, the flags are set again, and the process proceeds to step #1206 to perform a processing in accordance with each operation. The processing after the switch sensing (#1221) is performed in a similar manner. When it is determined at step #1206 that the flag AFF is 0, whether the flag PFF 1 showing the operation of the manual focusing dial 6 is 1 or not is determined (#1207).

When the flag PFF is 1, after performing a manual focusing and dioptric power adjustment processing (#1217), the process proceeds to the switch sensing (#1221). The manual focusing and dioptric power adjustment processing will be described later in detail with reference to FIGS. 16 and 17. When it is determined at step #1207 that the flag PFF is 0, whether the flag DAF showing the operations of the dioptric power adjusting buttons 8 and 9 is 1 or not is determined (#1208).

When the flag DAF is 1, after performing the manual focusing and dioptric power adjustment processing (#1217), the process proceeds to the switch sensing (#1221). When it is determined at step #1208 that the flag DAF is 0, whether the flag DMF showing the operation of the dioptric power memory button 10 is 1 or not is determined (#1209).

When the flag DMF is 1, after performing a dioptric power storing processing (#1218), the process proceeds to the switch sensing (#1221). The dioptric power storing processing will be described later in detail with reference to FIG. 20. When the flag DFM is 0, whether the flag DRF showing the operation of the main switch dial 7 is 1 or not is determined (#1210).

When the flag DRF is 1, after performing the dioptric power returning processing (#1219), the process proceeds to the switch sensing (#1221). The dioptric power returning processing will be described later in detail with reference to FIG. 21. When the flag DRF is 0, none of the switches has been operated, so that the voltages of the terminals PWC5 and PWC12 are set to high level to deactivate VDD1, VCC1 and VCC2 (#1211). Then, the process proceeds to step #1212 to determine whether the main switch SW is ON or OFF. When the main switch SW7 is ON, the microcomputer 601 again shifts to the standby state 2 (#1215). When the main switch SW7 is OFF, the process proceeds to the standby state 1 (#1214).

By the above-described processing, when any of the switches has been operated, a processing is performed in accordance with the operation, and when no switches have been operated, the flags are all reset to 0 by the switch sensing at step #1221, so that none of the processings is performed. The microcomputer 601 shifts to the standby state 1 or to the standby state 2 according to the condition of the main switch SW7.

Figure 14:
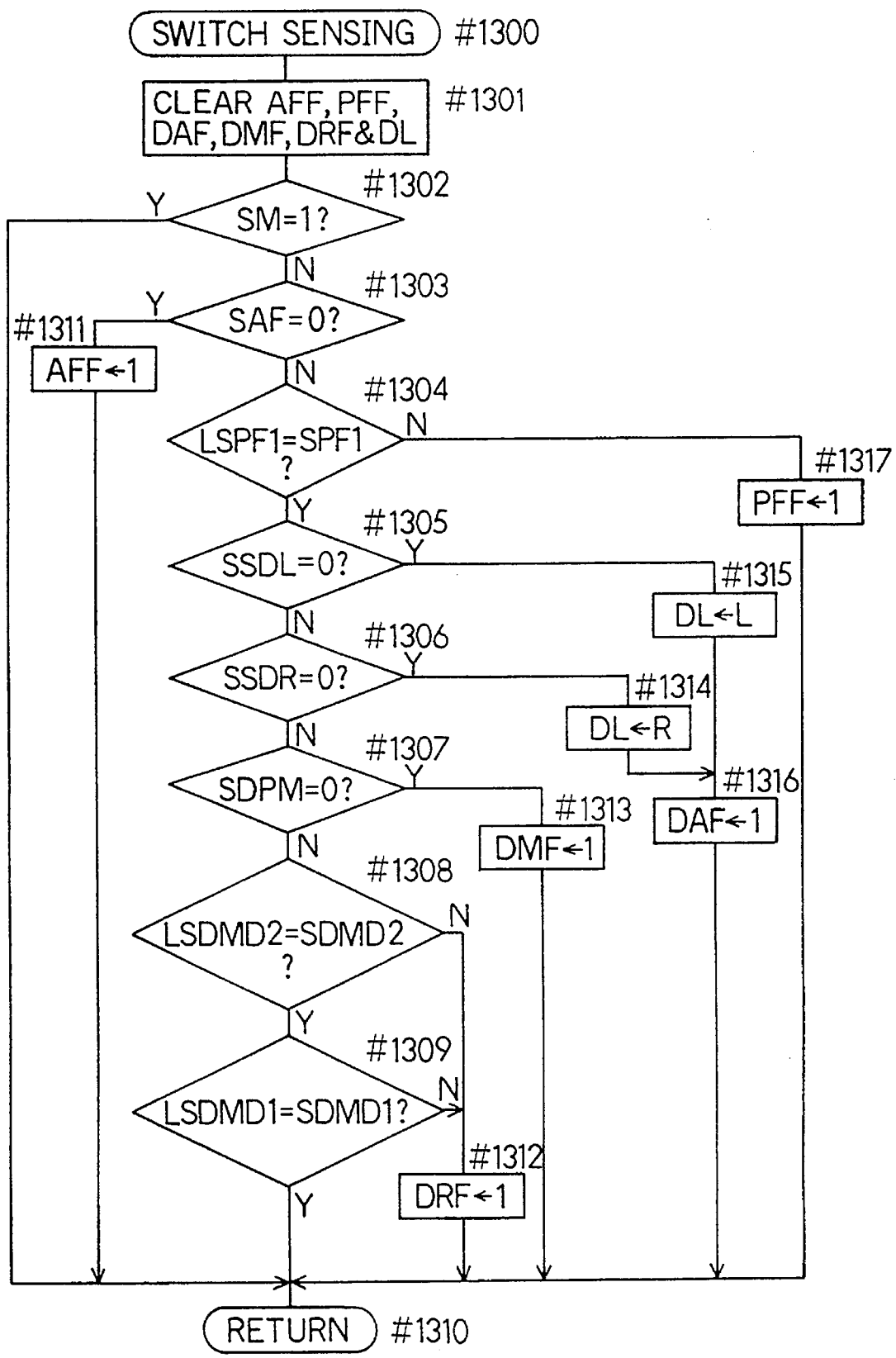
FIG. 14 is a flowchart of a switch sensing processing of the embodiment of the present invention.

Referring to FIG. 14, the above-mentioned switch sensing (corresponding to steps #1201 and #1221 of FIG. 13) will specifically be described. When the process enters the switch sensing subroutine (#1300), first, all the flags (AFF, PFF, DAF, DMF, DRF and DL) which have been set are cleared (#1301).

Then, the condition of the main switch dial 7 is determined (#1302). When the main switch dial 7 is OFF (SM=1), the process returns without setting any flags (#1310). Thereby, the microcomputer 601 shifts to the standby state 1 as described with reference to FIG. 13.

When it is determined at step #1302 that the main switch dial 7 is ON (SM=0), the condition of the terminal SAF is determined (#1303). When the AF button 5 has been depressed (SAF=0), the flag AFF is set to 1 (#1311). Then, the process returns (#1310). When the AF button has not been depressed (SAF=1), the condition of the terminal SPF1 showing the operation of the manual focusing dial 6 is determined (#1304). At this time, the present condition of the terminal SPF1 is compared with the condition of a flag LSPF1 showing the condition of the terminal SPF1 at the time of the completion of the last operation of the manual focusing dial 6 (#1304).

When it is determined at step #1304 that the condition of the terminal SPF1 is different from the value of the flag LSPF1 (LSPF1≠SPF1), the manual focusing dial 6 has been operated, so that the flag PFF is set to 1 (#1317) and the process returns (#1310). When the condition of the terminal SPF1 is the same as the value of the flag LSPF1 (LSPFI=SPF1), since the manual focusing dial 6 has not been operated, the condition of the terminal SSDL is determined (#1305).

When it is determined at step #1305 that the level of the terminal SSDL is low (SSDL=0), the left dioptric power adjusting button 9 has been operated, so that the flag DL showing which of the left and right dioptric powers is to be adjusted is set to L (#1315), and the flag DAF is set to 1 (#1316). Then, the process returns (#1310).

When it is determined at step #1305 that the level of the terminal SSDL is high (SSDL=1), the condition of the terminal SSDR is determined (#1306). When the level of the terminal SSDR is low (SSDR=0), the right dioptric power adjusting button 8 has been operated, so that the flag DF is set to R (#1314), and the flag DAF is set to 1 (#1316). Then, the process returns (#1310).

When it is determined at step #1306 that the level of the terminal SSDR is high (SSDR=1), the condition of the terminal is determined (#1307). When the level of the terminal SDPM is low (SDPM=0), the dioptric power memory button 10 has been operated, so that the flag DMF is set to 1 (#1313). Then, the process returns (#1310).

When it is determined at step #1307 that the level of the terminal SDPM is high (SDPM=1), the conditions of the terminals SDMD1 and SDMD2 are determined (#1308, #1309). As mentioned previously, the terminals SDMD1 and SDMD2 show the dioptric power memory position. The conditions of the terminals SDMD1 and SDMD2 are compared with the conditions of terminals LSDMD1 and LSDMD2 showing the last positions, respectively (#1308, #1309).

When either of the conditions of the terminals SDMD2 and SDMD1 has been changed (LSDMD2≠SDMD2, LSDMD1≠SDMD1), the dioptric power memory position has been changed, so that the flag DRF is set to 1 (#1312). Then, the process returns (#1310). When none of the conditions of the terminals SDMD2 and SDMD1 has been changed (LSDMD2=SDMD2, LSDMD1=SDMD1), the process returns with all the flags being cleared (#1310). In this case, the microcomputer 601 shifts to the standby state 2 as described with reference to FIG. 13.

Figure 15:
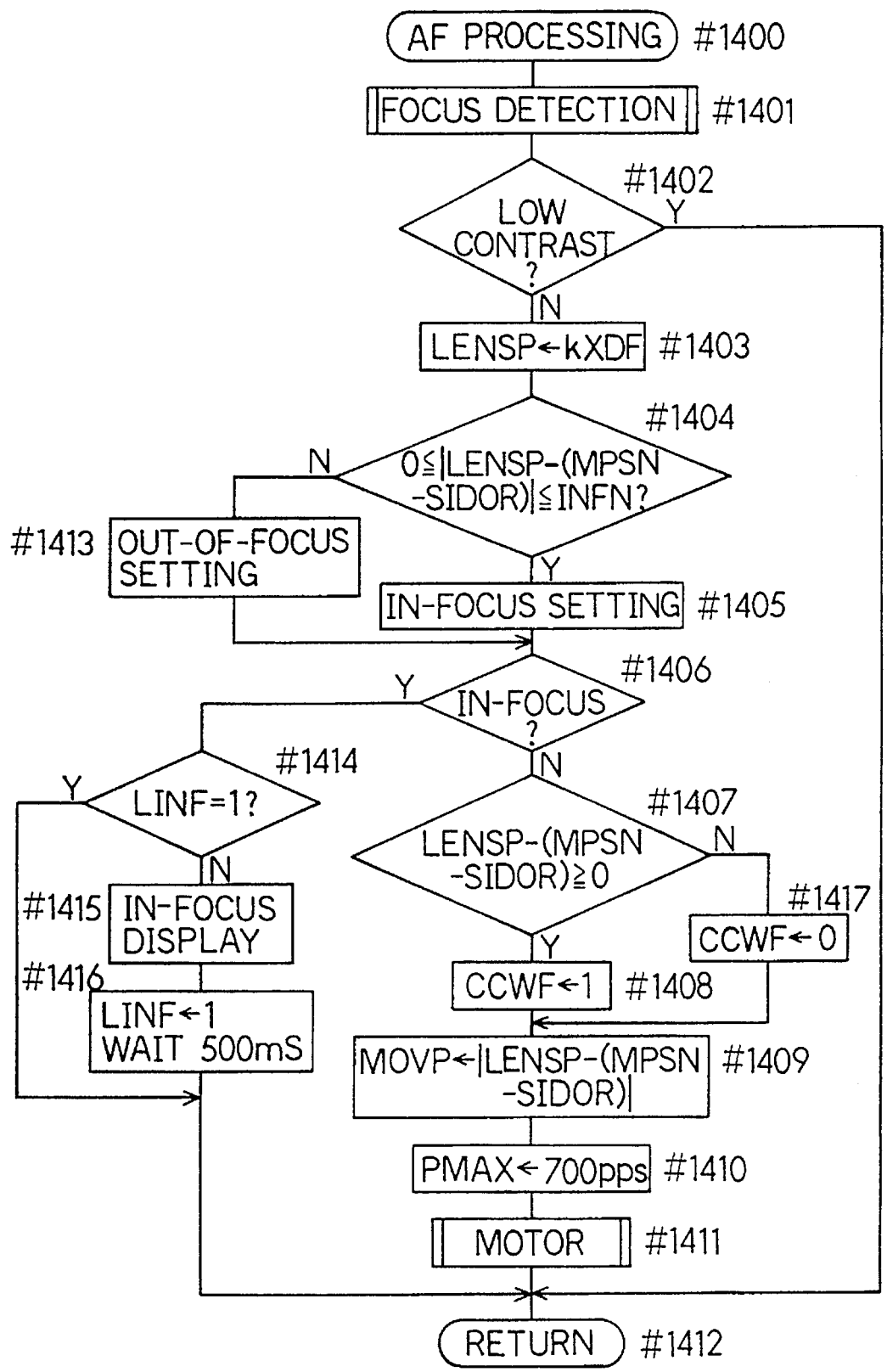
FIG. 15 is a flowchart of an automatic focusing processing of the embodiment of the present invention.

Referring to FIG. 15, the AF processing (corresponding step #1216 of FIG. 13) will be described. When the process enters the AF processing (#1400), first, focus detection is performed in the following manner (#1401): The terminal PWC12 is set at low level to supply VCC1 and VCC2. Thereby, the CCD 603 for focus detection is activated. Output of the integration in the CCD 603 and output of the pixels of the CCD 603 are analog-to-digital converted, and the data is taken in the microcomputer 601.

Focus detection is performed based on this data. A defocus amount DF showing the focus deviation amount, and also low contrast information when focus detection is impossible, are outputted. The defocus amount DF takes a positive and a negative value. It takes a positive value when the focusing lens FL is shifted from an in-focus position toward the eyepiece EL (315, 316) side (near object side, that is, the side of the hypermetropic eye E3). In this case, the focal point is the focal point of the objective lens OL (311,312) which is adjusted so that the defocus amount is 0 when the clearest image is obtained for the emmetropic eye E1 (dioptric power adjustment amount=0).

After the focus detection, whether the contrast was low or not is determined (#1402). When the contrast was low, the process returns without driving the lens. When the contrast was not low, the defocus amount is multiplied by a conversion coefficient k to obtain LENSP (#1403). LENSP is a value obtained by converting the defocus amount DF into a pulse number of a pulse motor (stepping motor) for driving the focusing lens FL.

At step #1404, whether an in-focus condition has been obtained or not is determined. Here, the in-focus condition is a condition where a clear image is observed by the user of the binocular. As described previously, when the dioptric power adjustment amount is 0 and the user has the emmetropic eye E1, the in-focus condition is obtained when the focusing lens FL is located at a position where LENSP is 0. However, the focusing lens FL is shifted from the position where LENSP by the dioptric power adjustment amount toward the objective lens OL side when the user has the myopic eye E2, and toward the eyepiece EL (315, 316) side when the user has the hypermetropic eye E3.

Figure 36:
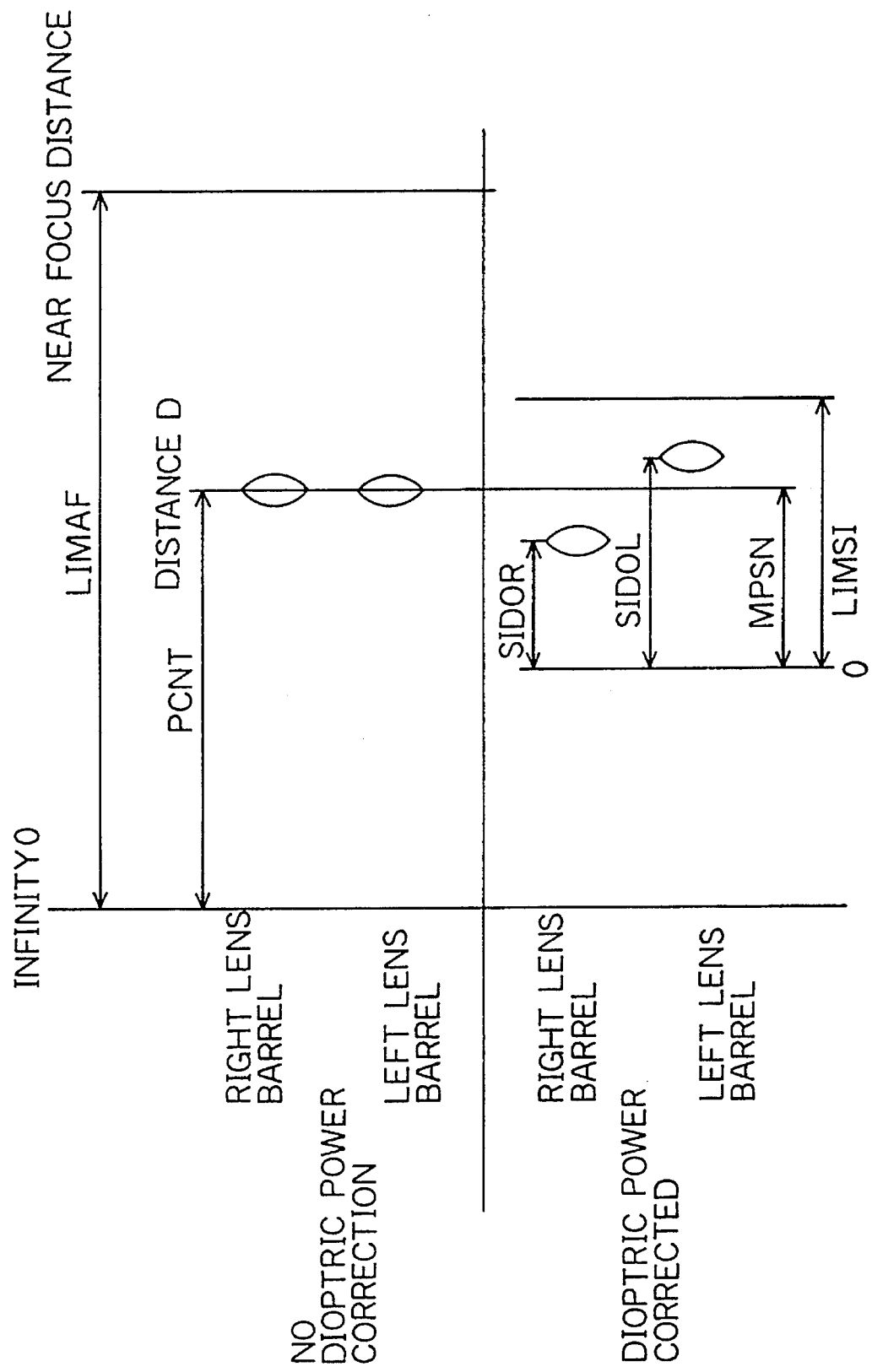
FIG. 36 shows a relationship between the dioptric power adjustment and the position of the focusing lens.

Referring to FIG. 36, the relationship between the dioptric power adjustment amount and the position of the focusing lens will be described in further detail. The in-focus position of the focusing lens when no dioptric power adjustment is made for an object at infinity is reference 0. The in-focus position of the focusing lens when no dioptric power adjustment is made for an object located at a distance D is set at PCNT in pulse unit of the stepping motor. The in-focus position of the focusing lens when no dioptric power adjustment is made for the nearest object is set at LIMAF. PCNT never exceeds LIMAF. The dioptric power correction amount is set by SIDOR and SIDOL. PCNT is the position of the lens when both the left and right focusing lenses FL are driven. PCNT varies at that time, but does not vary during the dioptric power adjustment. That is, PCNT varies during the manual or the automatic focusing (i.e. when both of the lenses are driven).

In a case shown in FIG. 36, for an object located at the distance D, a dioptric power correction (correction for the myopic eye E2) of MPSN-SIDOR is shown with respect to the right lens barrel 1, and a dioptric power correction (correction for the hypermetropic eye E3) of SIDOL-MPSN is shown with respect to the left lens barrel 2. SIDOR and SIDOL take values from 0 to LIMSI. That is, when SIDOR and SIDOL are 0, the correction amount is maximum for the myopic eye E2, and the dioptric power correction amount is MPSN. In the case of the hypermetropic eye E3, the correction amount is maximum when SIDOR and SIDOL are LIMSI, and the dioptric power correction amount is LIMSI-MPSN. SIDOR, SIDOL, MPSN and LIMSI are in pulse unit of the stepping motor.

It is clear that SIDOL and SIDOR are set to MPSN when no dioptric power correction is made. Since the dioptric power adjustment is made by the focusing lens as described above, in the case of the emmetropic eye E1, the in-focus condition is obtained when LENSP is 0, whereas in the case of the myopic eye E2 or the hypermetropic eye E3, the in-focus condition where the user observes the clearest image is obtained when LENSP equals the dioptric power correction amount.

Returning to FIG. 15, the description of the AF processing will be continued. At step #1404, whether |LENSP−(MPSN−SIDOR)| is within a predetermined amount INFN or not is determined. That is, whether a remaining deviation pulse considering the dioptric power correction amount is within a predetermined pulse number or not is determined. When the main switch dial 7 is at the normal position N, SIDOR-MPSN is 0 so that the dioptric power adjustment amount is 0, so that whether |LENSP| is within the predetermined amount INFN or not is determined. The reason why SIDOR is used is that the AF module 331 (FIG. 4) is arranged in the right lens barrel 1.

When it is determined at step #1404 that |LENSP−(MPSNSIDOR)| is within the predetermined pulse number, an in-focus setting is performed (#1405). When |LENSP−(MPSN−SIDOR)| exceeds the predetermined pulse number, an out-of-focus setting is performed (#1413). Then, at step #1406, whether the in-focus condition has been obtained or not is determined. When the infocus condition has not been obtained, whether LENSP−(MPSN−SIDOR) takes a positive value or a negative value is determined (#1407).

When it is determined at step #1407 that LENSP−(MPSN-SIDOR) takes a positive value (above 0), after setting the driving of the focusing lens FL toward the objective lens OL (toward an object at infinity) by setting 1 to CCWF (#1408), the process proceeds to step #1409. When LENSP-(MPSN-SIDOR) takes a negative value, after setting the driving of the focusing lens toward the eyepiece EL (toward a near object) by setting 0 to CCWF (#1417), the process proceeds to step #1409.

At step #1409, the driving amount |LENSP−(MPNS−SIDOR)| is set to a driving pulse number MOVP. Then, 700 pps is set to a driving speed PMAX (#1410), and after calling a lens driving routine MOTOR (#1411), the process returns (#1412). The lens driving routine MOTOR will be described later in detail with reference to FIGS. 22 and 23.

When it is determined at step #1406 that the in-focus condition has been obtained, whether a flag LINF is 1 or not is determined (#1414). The flag LINF is reset to 0 by the flag initialization (#1203 of the activation 2 of FIG. 13). When the flag LINF is 0, this means that the in-focus condition is obtained for the first time after the operation of the AF button 5. Therefore, the LED 11b is turned on to provide an in-focus display (#1415). Then, the flag LINF showing that the in-focus condition has been obtained once is set to 1, and after waiting 500 milliseconds (#1416), the process returns (#1412). When it is determined at step #1414 that the flag LINF is set to 1, this means that the in-focus has been obtained once, so that the process returns (#1412).

By this control operation, when the AF button 5 is operated, the focusing lens FL is driven until the in-focus condition is obtained, and the in-focus display is provided when the infocus condition is obtained for the first time, so that the process waits 500 milliseconds. Further, when the AF button 5 has been operated, the AF operation is continuously performed thereafter. Even when the operation of the AF button 5 is stopped immediately after it is operated, focus detection is performed at least once to perform the AF operation.

Figure 16:
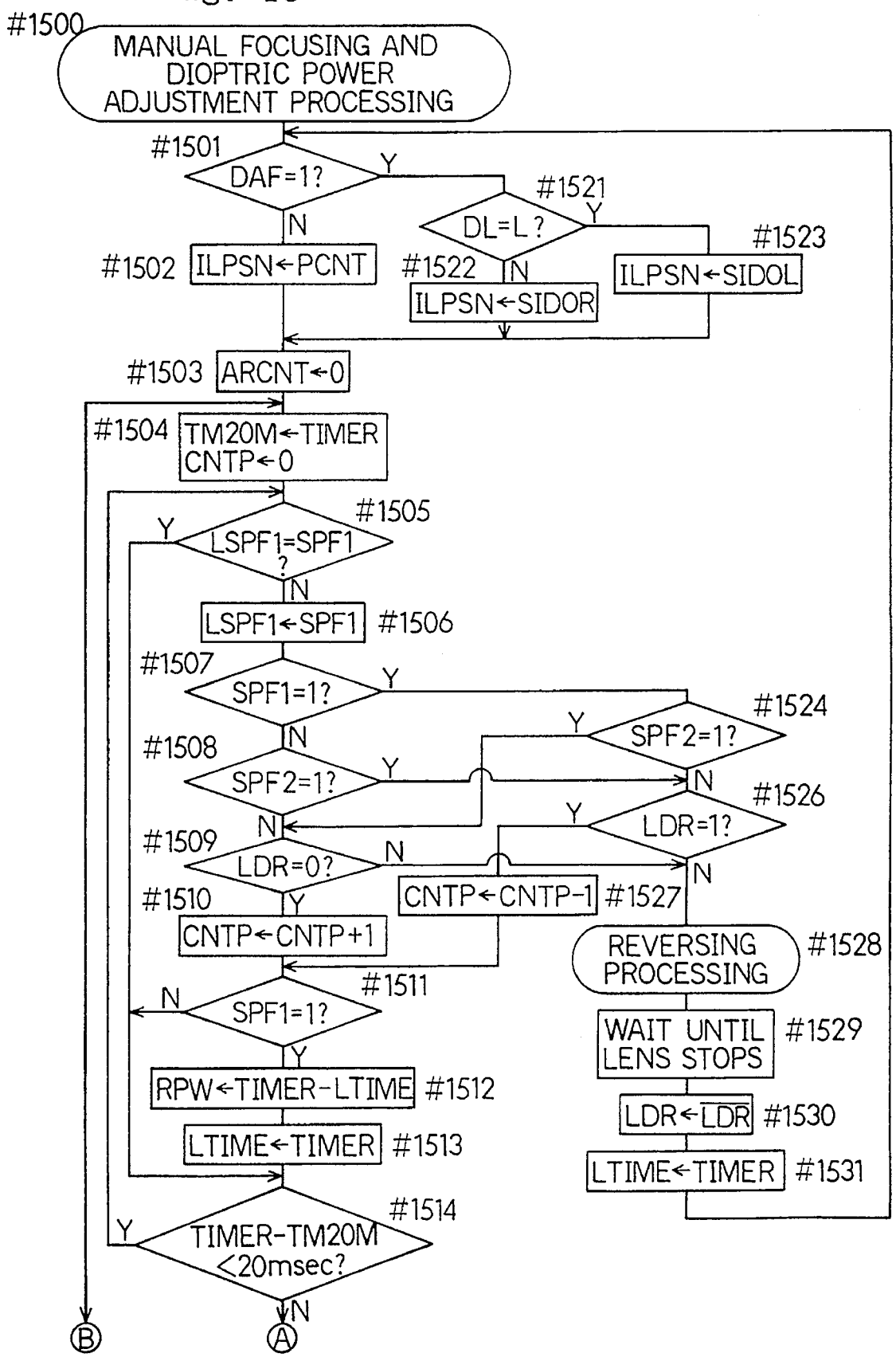
FIGS. 16 and 17 show a flowchart of a manual focusing/ dioptric power adjustment processing of the embodiment of the present invention.
Figure 17:
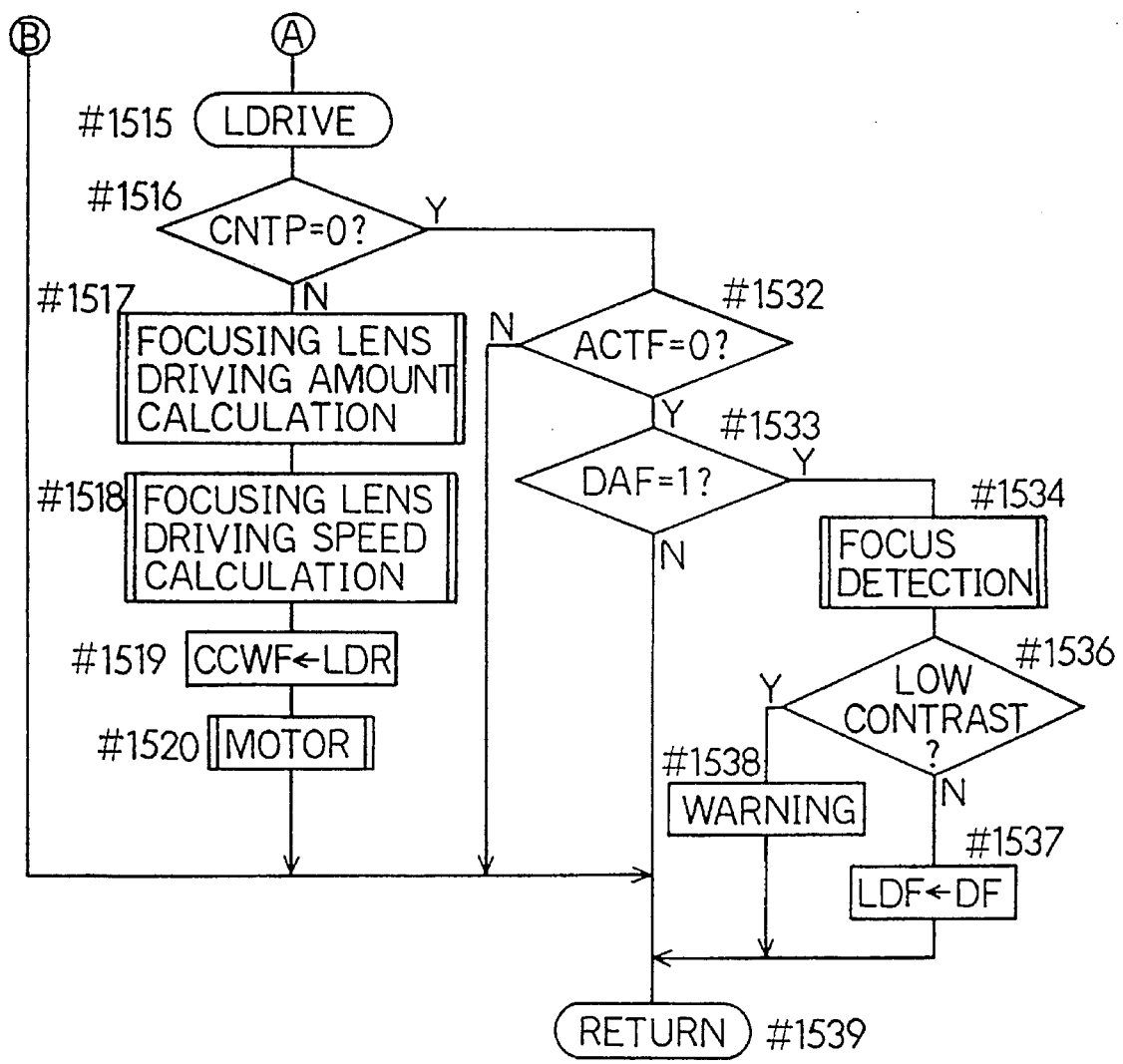

Referring to FIGS. 16 and 17, a manual focusing processing (corresponding to step #1217 of FIG. 13) performed when the manual focusing dial 6 is operated will be described. When the manual focusing dial 6 is operated, the microcomputer 601 shifts its control to the manual focusing control as described with reference to step #1217 of FIG. 13 (#1500). When the manual focusing processing is started, as described previously, since this routine is also executed at the time of the dioptric power adjustment, whether the dioptric power adjustment is to be performed or the manual focusing is to be performed is determined by determining the condition of the flag DAF (#1501).

When the manual focusing is to be performed (DAF=0), the present lens position PCNT is set to an operation start lens position ILPSN (#1502). When the dioptric power adjustment is to be performed (DAF=1), whether the right lens barrel 1 or the left lens barrel 2 is to be adjusted is determined (#1521). When the right lens barrel 1 is to be adjusted (DL=R), SIDOR is set to ILPSN (#1522). When the left lens barrel 2 is to be adjusted (DL=L), SIDOL is set to ILPSN (#1523). Then, ARCNT representative of the cumulation value of the number of pulses generated at the terminal SPF1 by the operation of the manual focusing dial 6 from the start of the operation is cleared to 0 (#1503).

The present time in TIMER is set to TM20M. Further, CNTP representative of the number of pulses generated at the terminal SPF1 for a period of 20 milliseconds is cleared to 0 (#1504). Then, whether the condition of the terminal SPF1 has been changed or not is determined by comparing the present value of the terminal SPF1 with LSPF1 which is the last value of the terminal SPF1 (#1505).

When it is determined at step #1505 that LSPF1≠SPF1, since a pulse edge is generated, the condition of the terminal SPF1 is set to the flag LSPF1 for the next determination of step #1505 (#1506). In this case, whether the dial has been turned or not is determined. To do so, the present condition of the switch is stored and whether the condition has been changed or not is determined when the process comes to this step again. Then, the phases of two pulses are determined by comparing the condition of the terminal SPF1 with the condition of the terminal SPF2. When SPF1=SPF2=1 (#1507 and #1524) or SPF1=SPF2=0 (#1507 and #1508), the manual focusing dial 6 has been operated so that the focusing lens FL is driven toward the near object side. When SPF1≠SPF2, the manual focusing dial 6 has been operated so that the focusing lens is driven toward the infinite object side (#1507, #1508 and #1524).

When SPF1=SPF2=1 or SPF1=SPF2=0, the determination of LDR to which the driving direction of up to that time is set is made (#1509). When the direction of operation of the dial is the same between the last time and the present time (LDR=0) and the dial was operated to drive the focusing lens FL toward the near object side last time, 1 is added to CNTP by setting CNTP+1 thereto (#1510), and the process proceeds to step #1511. When it is determined at step #1509 that the dial operation direction is different between the last time and the present time (LDR=1), the process proceeds to a reversing processing (#1528).

The determination of LDR is also made when SPF1≠SPF2 (#1526). When the dial operation direction is different between the last time and the present time and the focusing lens FL is driven toward the infinity object side both at the last time and at the present time, CNTP-1 is set to CNTP (#1527), and the process proceeds to step #1511. When LDR=0, since the operation direction of the manual focusing dial 6 is different between the present time and the last time, the process proceeds to the reversing processing (#1528).

In the reversing processing (#1528), the process waits until the driving of the focusing lens FL is finished (#1529), and the complement of LDR is set to LDR representative of the driving direction (#1530). Then, to find the width of a pulse generated at the terminal SPF1 by the rotation of the manual focusing dial 6, the present time TIMER is set to LTIME (#1531). Thereafter, the microcomputer 601 shifts its control to the manual focusing again (#1501). By the above reversing processing (#1528), even if the operation direction of the manual focusing dial 6 is reversed, the driving of the focusing lens FL by the driving amount set up to that time is finished before the focusing lens FL is driven in the opposite direction.

When it is determined at step #1509 that the operation direction of the manual focusing dial 6 has not been reversed, after CNTP is increased by 1 as described previously (#1510), whether the terminal SPF1 is 1 or 0 is determined (#1511). When SPF1=1, since a rise edge is generated this time, TIMER-LTIME is set to RPW representative of the width of a pulse inputted to the terminal SPF1 (#1512). Then, for the next pulse width setting, the present time TIMER is set to LTIME (#1513). When it is determined at step #1511 that SPF1=0, the pulse width is not updated and process proceeds to step #1514.

Then, at step #1514, TM20M is subtracted from the present time TIMER, and whether 20 milliseconds have been elapsed or not (whether TIMER−TM20M<20 milliseconds or not) is determined. When 20 milliseconds have not been elapsed (TIMER=TM20M<20 milliseconds), the process returns to step #1505. When 20 milliseconds have elapsed (TIMER-TM20M≧20 milliseconds), the process proceeds to LDRIVE (#1515).

In the processing of LDRIVE (step #1515 of FIG. 17), first, whether CNTP is 0 or not is determined (#1516). That CNTP is 0 shows that no pulse is inputted to the terminal SPF1 in 20 milliseconds and the manual focusing dial 6 has not been operated. That CNTP is not 0 shows that the manual focusing dial 6 has been operated.

When CNTP is not 0, the driving amount of the focusing lens FL for the operation amount of the manual focusing dial 6 is calculated (#1517). The calculation of driving amount of the focusing lens FL will be described later in detail with reference to FIG. 18. Then, the driving speed of the focusing lens FL is calculated (#1518). The calculation of driving speed of the focusing lens FL will be described later in detail with reference to FIG. 19.

LDR is set to the flag CCWF in order to set the driving direction of the focusing lens FL in accordance with the operation direction of the manual focusing dial 6 (#1519). Then, a motor driving subroutine MOTOR is called (#1520). Thereby, the focusing lens FL is moved by a set amount in a set direction at a set speed. Whether the dioptric power adjustment is to be performed or the manual focusing is to be performed is determined in the subroutine MOTOR. In this case, only the focusing lens FL in the lens barrel for which the dioptric power adjustment is made is driven. While the motor is driven both in the dioptric power adjustment and in the manual focusing, both right and left lenses are driven in the manual focusing and either one of the left and right focusing lenses FL is driven in the dioptric power adjustment. The motor driving subroutine MOTOR will be described later in detail with reference to FIGS. 22 and 23. After the subroutine MOTOR is finished, the process returns to step #1504.

When it is determined at step #1516 that CNTP=0, the condition of a flag ACTF showing whether the focusing lens is being driven or not is determined (#1532). When the focusing lens is being driven (ACTF=1), the process returns to step #1504 to determine the operation of the manual focusing dial 6. When the driving of the focusing lens FL is finished (ACTF=0), whether the dioptric power adjustment is to be performed or not is determined (#1533).

When the manual focusing is to be performed (DAF=0), the process returns (#1539). When the dioptric power adjustment is to be performed (DAF=1), focus detection is performed (#1534). Then, whether focus detection is impossible (low contrast) or not is determined (#1536). When focus detection is impossible, since the dioptric power adjustment may not have correctly been made, so that the LED 11*b* is blinked to provide a warning (#1538). When focus detection is not impossible, a detected defocus amount DF is set to LDF (#1537). Then, the process returns (#1539).

Figure 18:
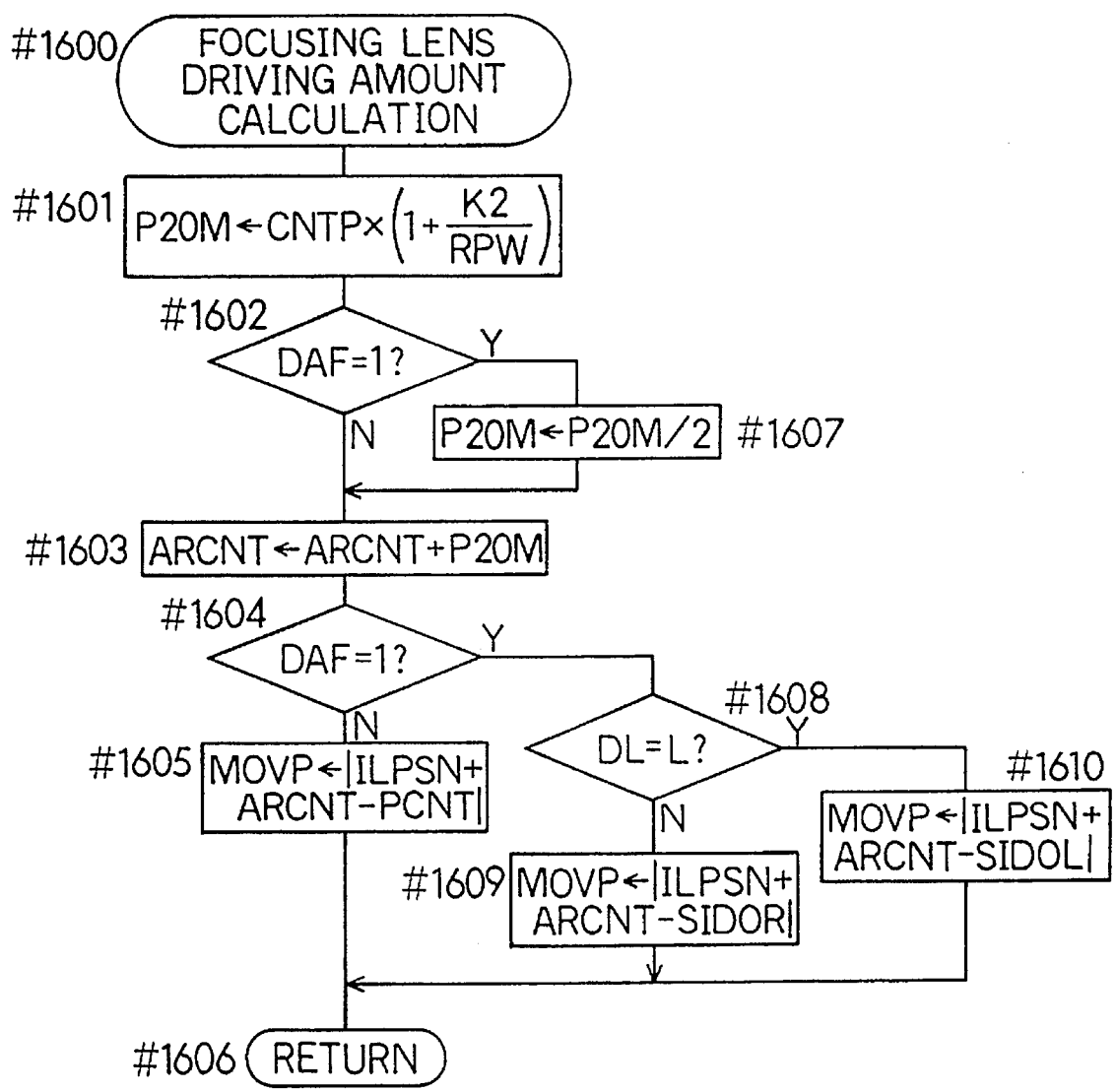
FIG. 18 is a flowchart of a focusing lens driving amount calculation processing of the embodiment of the present invention.

Referring to FIG. 18, the calculation of driving amount of the focusing lens when the manual focusing dial 6 is operated (corresponding to step #1517 of FIG. 17) will be described. When the process enters the calculation of driving amount of the focusing lens FL (#1600), first, the edge number CNTP of the pulse inputted to the terminal SPF1 in 20 milliseconds by the rotation of the manual focusing dial 6 is multiplied by (1+K2/RPW) and the result is set to P20M (#1601). RPW is the pulse width of the terminal SPF1, and K2 is a constant. RPW, which is in inverse proportion to the operation speed of the manual focusing dial 6, is set so that the driving amount of the focusing lens FL is large when the operation speed is high and small when the operation speed is low. When a pulse edge is inputted to the terminal SPF1, the focusing lens FL is surely driven by an amount corresponding to one pulse. P20M is a driving amount of the focusing lens FL driven by the manual focusing dial 6 in 20 milliseconds.

Then, whether the dioptric power adjustment is to be performed or the manual focusing is to be performed is determined (#1602). When the manual focusing is to be performed (DAF=0), the process proceeds to step #1603. When the dioptric power adjustment is to be performed (DAF=1), after half the P20M is re-set to P20M (#1607), the process proceeds to step #1603. That is, in the dioptric power adjustment, the focusing lens FL is driven only by half the amount compared to the manual focusing. For this reason, a highly accurate dioptric power adjustment is possible.

At step #1603, ARCNT+P20M is set to the cumulation value ARCNT of P2OM (#1603). That is, to ARCNT, the cumulation value, from the start of the operation of the manual focusing dial 6, of pulses necessary for driving the focusing lens FL is set.

Then, at step #1604, whether the dioptric power adjustment is to be performed or the manual focusing is to be performed is determined (#1604). When the manual focusing is to be performed (DAF=0), ARCNT is added to the position ILPSN at which the focusing lens FL is located at the start of the operation of the manual focusing dial 6, the present lens position PCNT is subtracted therefrom, and the absolute value thereof is obtained. The result is set to MOVP (#1605). Then, the process returns.

Figure 22:
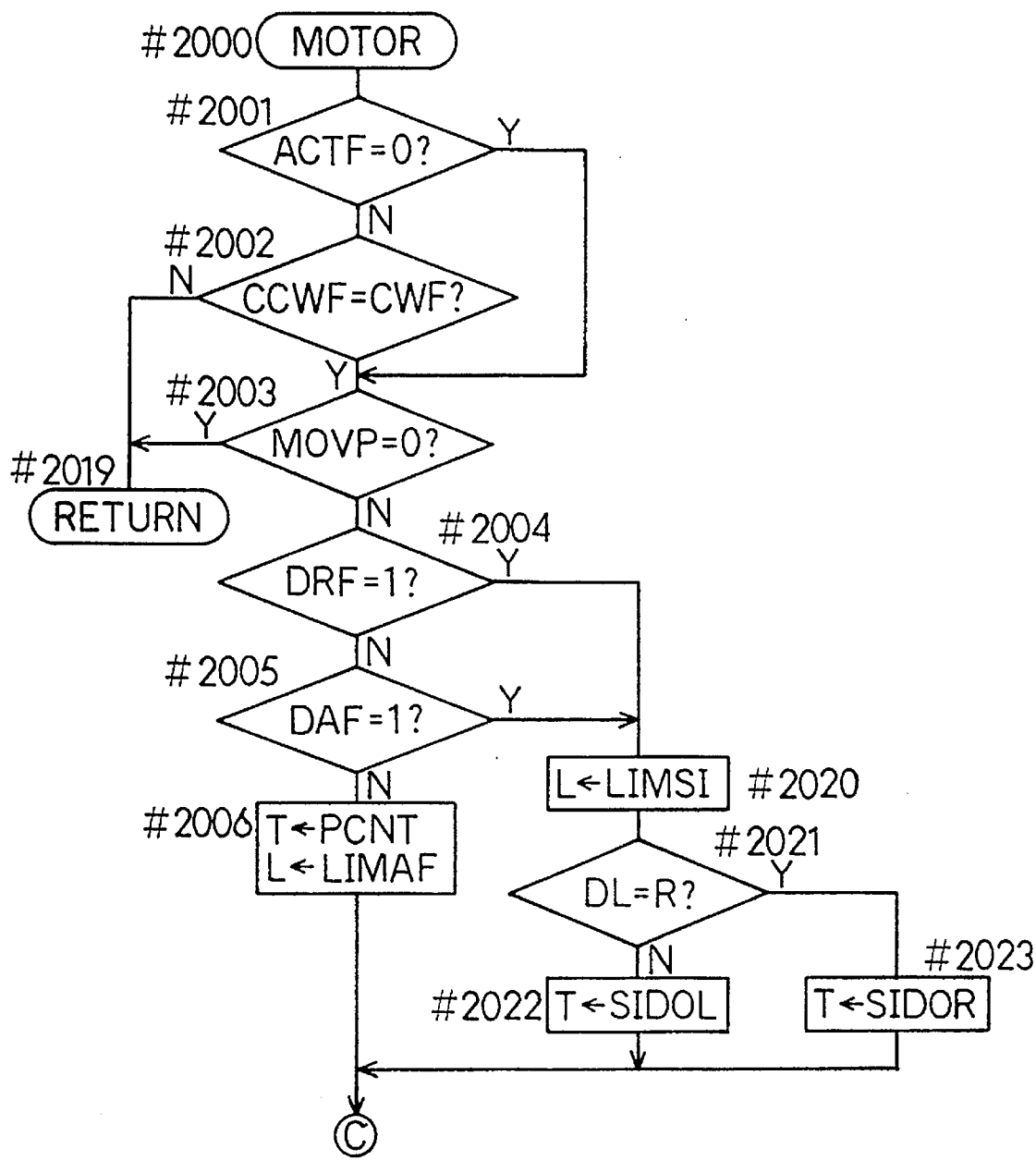
FIGS. 22 and 23 show a flowchart of a MOTOR processing of the embodiment of the present invention.

When the dioptric power adjustment is to be performed (DAF=1), whether the dioptric power adjustment is made for the right lens barrel 1 or for the left lens barrel 2 is determined (#1608). When the adjustment is made for the right lens barrel 1 (DL=R), |ILPSN+ARCNT−SIDOR| is set to MOVP (#1609). When the adjustment is made for the left lens barrel 2 (DL=L), |ILPSN+ARCNT−SIDOL| is set to MOVP (#1610). Then, the process returns. That is, to MOVP, the number of remaining driving pulses from the time of the start of the operation which number is obtained by subtracting the present lens position from the target lens position is set. Thereby, the focusing lens FL is driven by an amount corresponding to the pulse number set to MOVP in the lens driving routine MOTOR (FIG. 22).

One feature of this embodiment is that the lens driving speed is different between in the manual (power) focusing mode (high speed) in which the driving range of the focusing lens FL is large and in the dioptric power adjustment mode (low speed) in which the driving range of the focusing lens FL is small. This corresponds to steps #1602 and #1607 of FIG. 18.

When the user operates the manual focusing dial 6 while depressing the right dioptric power adjusting button 8 or the left dioptric power adjusting button 9, since the mode is changed to the dioptric power adjustment mode in which the lens driving range is small, the microcomputer 601 controls motors 321 and 322 so that the lens driving amount corresponding to the operation amount of the manual focusing dial 6 is small compared to the manual focusing mode in which the driving range is large, so that the focusing lens FL is driven at a low speed.

When the user operates the manual focusing dial 6 without depressing the right dioptric power adjusting button 8 or the left dioptric power adjusting button 9, since the mode is changed to the manual focusing mode in which the lens driving range is large, the microcomputer 601 controls the motors 321 and 322 so that the lens driving amount corresponding to the operation amount of the manual focusing dial 6 is large compared to the dioptric power adjustment mode in which the driving range is small, so that the focusing lens FL is driven at a high speed.

Thus, in the dioptric power adjustment, the driving amount of the focusing lens for an operation amount of the manual focusing dial 6 is small and the driving speed is low, so that the dioptric power adjustment is made with high accuracy. In the manual focusing, the driving amount of the focusing lens FL for an operation amount of the manual focusing dial 6 is large and the driving speed is high, so that the focusing lens FL can be driven in a wide range by a small driving amount at a high speed. Thus, the focusing lens FL can be driven quickly with high accuracy in a binocular where the mode is changed between a mode (dioptric power adjustment mode) in which the driving range of the focusing lens FL is small and a mode (manual focusing mode) in which the driving range is large.

In conventional lens driving systems, unlike this embodiment, the mode in which the driving range is small is not provided, and the driving amount for an operation amount does not depend on the driving range. Further, in a mode requiring high accuracy, the driving amount for an operation amount is not reduced.

Figure 19:
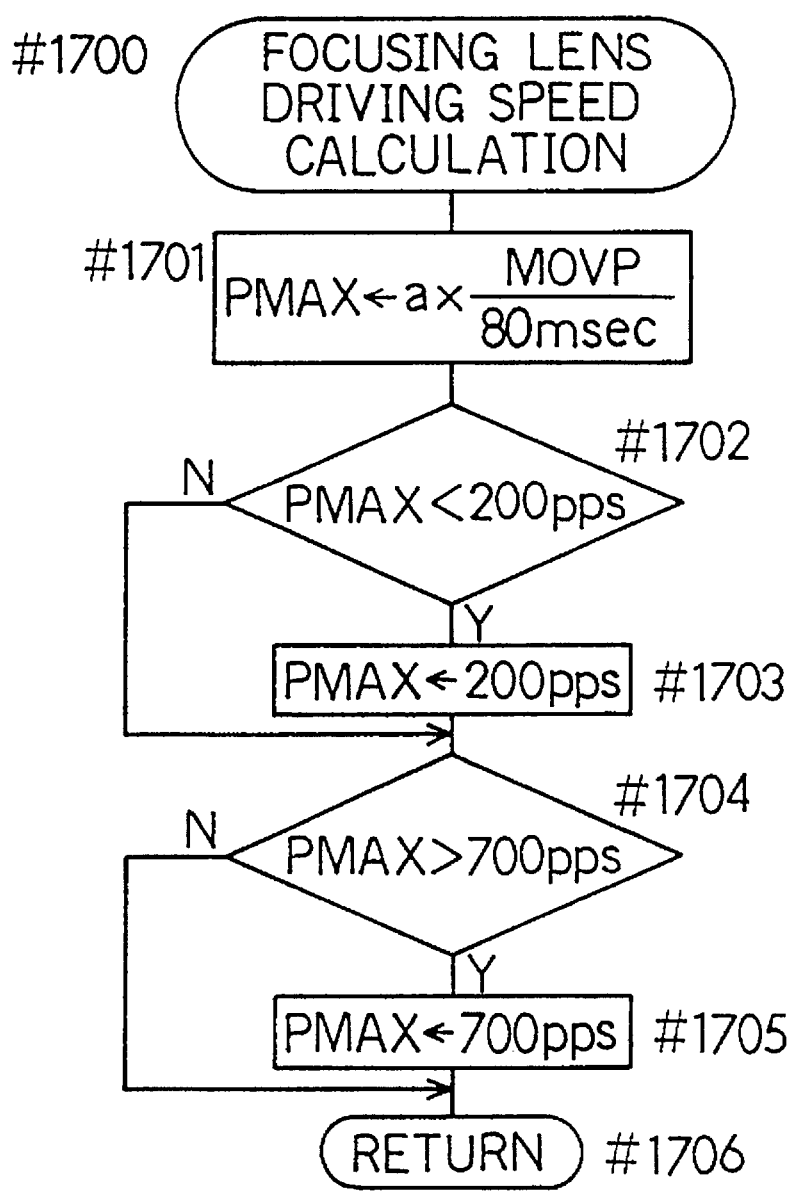
FIG. 19 is a flowchart of a focusing lens driving speed calculation processing of the embodiment of the present invention.

Referring to FIG. 19, the calculation of driving speed of the focusing lens FL (corresponding to step #1518 of FIG. 17) will be described. When the process enters the flow of the calculation of driving speed of the focusing lens FL (#1700), a×MOVP/80 mS is set to PMAX for setting the speed of the stepping motor for driving the focusing lens FL (#1701). MOVP is the number of driving pulses, a is a coefficient for setting the speed at which the focusing lens FL is driven at a set MOVP in 80 milliseconds. The lens driving subroutine MOTOR (FIG. 22) is called, as described previously (#1514 of FIG. 16, etc.), at a period of 20 milliseconds after the driving amount MOVP, the driving direction CCWF and the driving speed PMAX are set.

In the subroutine MOTOR, the driving of the stepping motor is started, and the process immediately returns from the subroutine MOTOR. The actual driving of the stepping motor is performed by a timer interrupt corresponding to a pulse rate. By driving the lens in 80 milliseconds by an amount corresponding to the pulse number thus set, the driving speed is increased so that the driving is finished within 80 milliseconds when the focusing lens driving amount for the operation of the manual focusing dial 6 is large, so that the responsibility is excellent. Since the driving is finished in 80 milliseconds which are longer than the control period of 20 milliseconds, the focusing lens FL is continuously and smoothly driven.

Then, whether the set driving speed PMAX is lower than 200 pps (PMAX<200 pps) or not is determined (#1702). When it is lower, 200 pps is re-set to PMAX to limit the minimum speed (#1703). Then, the process proceeds to step #1704. When PMAX is higher, the process proceeds to step #1704.

Then, whether the driving speed PMAX is higher than 700pps (PMAX>700 pps) or not is determined (#1704). When it is higher, 700 pps is re-set to PMAX to limit the maximum speed (#1705). Then, the process returns (#1706). When it is lower, the process proceeds to step #1706.

As is clear from the above description, even if the operation amount of the manual focusing dial 6 is the same, the driving amount of the focusing lens FL in the dioptric power adjustment is half the driving amount of the focusing lens FL in the manual focusing (#1602 and #1607 of FIG. 18), so that the focusing lens driving amount is reduced. That is, since the driving speed is set so that the driving corresponding to the pulse number P2OM is finished in 80 milliseconds, the speed decreases as the value of P20M decreases, so that the movement amount of the focusing lens FL decreases compared to the operation amount of the manual focusing dial 6. As a result, the accuracy improves.

Figure 20:
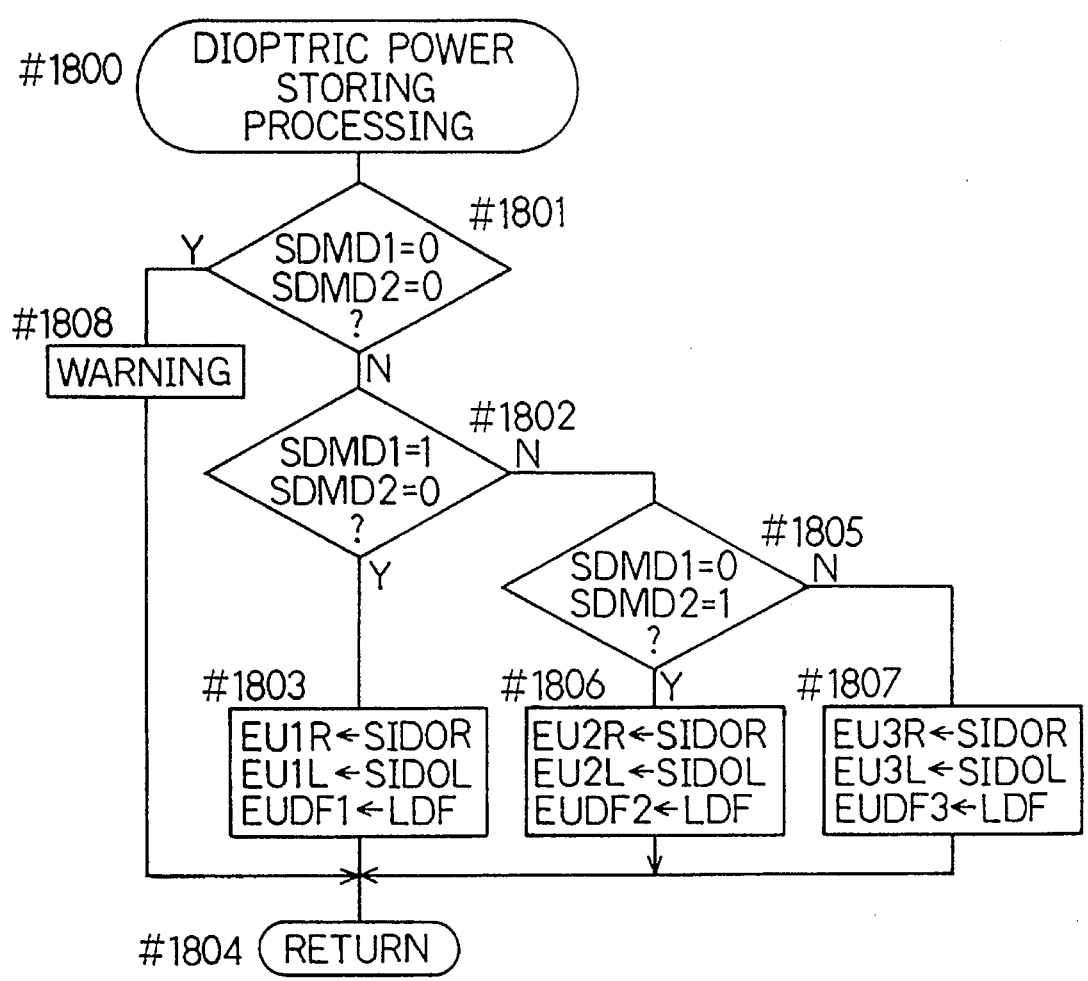
FIG. 20 is a flowchart of a dioptric power storing processing of the embodiment of the present invention.

Referring to FIG. 20, the dioptric power storing processing (corresponding to step #1218 of FIG. 13) will be described. When the process enters the dioptric power storing processing (#1800), first, the conditions of SDMD1 and SDMD2 are determined to determine which dioptric power position has been selected. The relationship between the conditions of SDMD1 and SDMD2, and the user position is as shown in Table 1 and as described previously.

At step #1801, whether SDMD1=0 and SDMD2=0 or not is determined. When the normal position mode (SDMD1=0 and SDMD2=0) has been selected, since the normal position is a position where no dioptric power adjustment is made, the dioptric power storing operation is not accepted. For this reason, the LED 11b is blinked to provide a warning (#1808). Then, the process returns.

When it is determined at step #1801 that it does not hold that SDMD=0 and SDMD2=0, at step #1802, whether SDMD1=1 and SDMD2=0 or not is determined. When the dioptric power memory 1 has been selected (SDMD1=1 and SDMD2=0), the dioptric power correction position SIDOR of the focusing lens FL of the right lens barrel 1 is stored in EU1R, and the dioptric power correction position SIDOL of the focusing lens FL of the left lens barrel 2 is stored in EU1L (#1803). Also, LDF which is a defocus amount at the time of the end of the dioptric power adjustment is stored in EUDF1 (#1803). Then, the process returns (#1804).

When it is determined at step #1802 that it does not hold that SDMD1=1 and SDMD2=0, at step #1805, whether SDMD1=0 and SDMD2=1 or not is determined. When the dioptric power memory 2 has been selected (SDMD1=0 and SDMD2=1), SIDOR is stored in EU2R, SIDOL is stored in EU2L, and LDF is stored in EUDF2 (#1806). Then, the process returns (#1804).

When it is determined at step #1805 that it does not hold that SDMD1=0 and SDMD2=1, the dioptric power memory 3 has been selected (SDMD1=1 and SDMD2=1). In this case, IDOR is stored in EU3R, SIDOL is stored in EU3L, and LDF is stored in EUDF3 (#1807). Then, the process returns (#1804). EU1R, EU1L, EUDF1, EU2R, EU2L, EUDF2, EU3R, EU3L and EUDF3 are data to be stored in the EEPROM 602.

Figure 21:
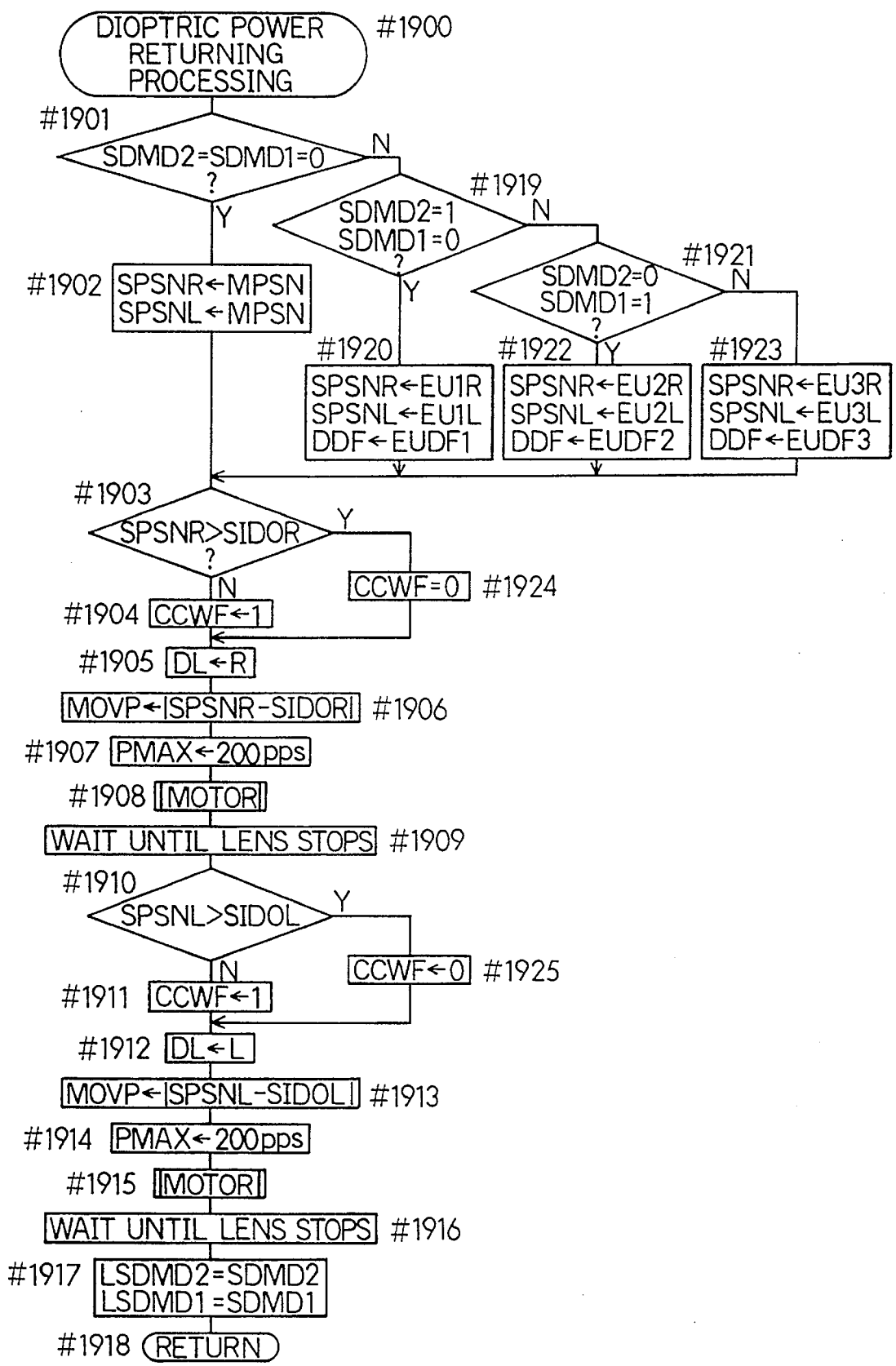
FIG. 21 is a flowchart of a dioptric power returning processing of the embodiment of the present invention.

Referring to FIG. 21, the dioptric power returning processing (corresponding to step #1107 of FIG. 12 and step #1219 of FIG. 13) will be described. As described previously, the dioptric power returning is performed when the dioptric power position is set with the main switch dial 7 being ON or when the dioptric power position is changed in the standby state 2. One feature of this embodiment is, as described previously, that a mode in which the dioptric power position can be set to 0 is provided. Steps #1901 to #1909 of the dioptric power returning processing correspond to the feature.

When the process enters the dioptric power returning processing (#1900), first, whether SDMD1=SDMD2=0 or not is determined (#1901). When SDMD1=SDMD2=0, the normal position has been selected. In this case, since the dioptric power adjustment is not made, the focusing lens FL is set at a position where the dioptric power adjustment amount is 0. That is, MPSN is set to SPSNR and MPSN is set to SPSNL (#1902). Then, the process proceeds to step #1903. MPSN represents a focusing lens position corresponding to the emmetropic eye E1 with a dioptric power of 0. SPSNR and SPSNL are for temporarily storing the dioptric power of the user to obtain the differences between the presently-set SIDOR and SIDOL and the stored SIDOR and SIDOL.

When it is determined at step #1901 that SDMD1=SDMD2=0 does not hold, at step #1919, whether SDMD1=0 and SDMD2=1 or not is determined. When SDMD1=1 and SDMD2=0, the dioptric power memory 1 has been selected. In this case, SPSNR and SPSNL are respectively set to EU1R and ER1L which are focusing lens positions (i.e. the pulse numbers when the dioptric power is 0) corresponding to the dioptric powers stored in the EEPROM 602 in the dioptric power storing processing (FIG. 20) (#1920). Likewise, the defocus amount EUDF1 stored in the EEPROM 602 in the dioptric power storing processing is set to DDF (#1920). Then, the process proceeds to step #1903.

When it is determined at step #1919 that it does not hold that SDMD1=0 and SDMD2=1, at step #1921, whether SDMD1=1 and SDMD2=0 or not is determined. When SDMD1=1 and SDMD2=0, the dioptric power memory 2 has been selected. At this time, like step #1920, EU2R, EU2L and EUDF2 are set to SPSNR, SPSNL and DDF, respectively (#1922). Then, the process proceeds to step #1903.

When it is determined at step #1921 that it does not hold that SDMD1=1 and SDMD2=0 (i.e. when SDMD1=1 and SDMD2=1), the dioptric power memory 3 has been selected. At this time, EU3R, EU3L and EUDF2 are respectively set to SPSNR, SPSNL and DDF (#1923). Then, the process proceeds to step #1903.

Then, the lens driving for the dioptric power returning of the right lens barrel 1 is performed. First, at step #1903, the value of SPSNR and the value of the present dioptric power adjustment position SIDOR are compared. When SPSNR>SIDOR, since the lens is driven toward the near side, 0 is set to CCWF (#1924). When SPSNR≦SIDOR, since the lens is driven toward the infinity side, 1 is set to CCWF (#1904).

Then, to show the driving of the focusing lens FL of the right lens barrel 1, R is set to DL (#1905), |SPSNR−SIDOR| is set to the lens driving amount MOVP (#1906), and 200 pps is set to the lens driving speed PMAX (#1907). Then, the subroutine MOTOR is called (#1908), and the process waits until the lens driving is finished (#1909). Thereby, the dioptric power of the right lens barrel 1 is returned to the dioptric power stored in the dioptric power storing processing (FIG. 20). The subroutine MOTOR will be described later in detail with reference to FIGS. 22 and 23.

Then, the dioptric power returning of the left lens barrel 2 is performed. At step #1910, whether SPSNL>SIDOL or not is determined. When SPSNL>SIDOL, 0 is set to CCWF (#1925). When SPSNL≦SIDOL, 1 is set to CCWF (#1911). Thereby, the lens driving direction is set. Then, L is set to DL to specify the driving of the focusing lens FL of the left lens barrel 2 (#1912), and |SPSNL−SIDOL| is set to the driving pulse number MOVP (#1913).

Then, 200 pps is set to the driving speed PMAX (#1914), the subroutine MOTOR is called (#1915), and the process waits until the lens driving is finished (#1916). The subroutine MOTOR will be described later in detail with reference to FIGS. 22 and 23.

By the above-described processing, the dioptric power of the left lens barrel 2 is also returned, so that the dioptric powers of the right and left lens barrels 1 and 2 are both returned to the dioptric powers stored in the dioptric power storing processing (FIG. 20). When the normal position is selected, the focusing lenses FL of the right and left lens barrels 1 and 2 are both set to the position MPSN, so that the dioptric power correction amount is 0.

Then, after SDMD2 is set to LSDMD2 and SDMD1 is set to LSDMD1 (#1917), the process returns (#1918). This setting is for detecting that the dioptric power position is changed in the above-described switch sensing (FIG. 14). That is, the dioptric power position of this time is stored by this setting.

Figure 23:
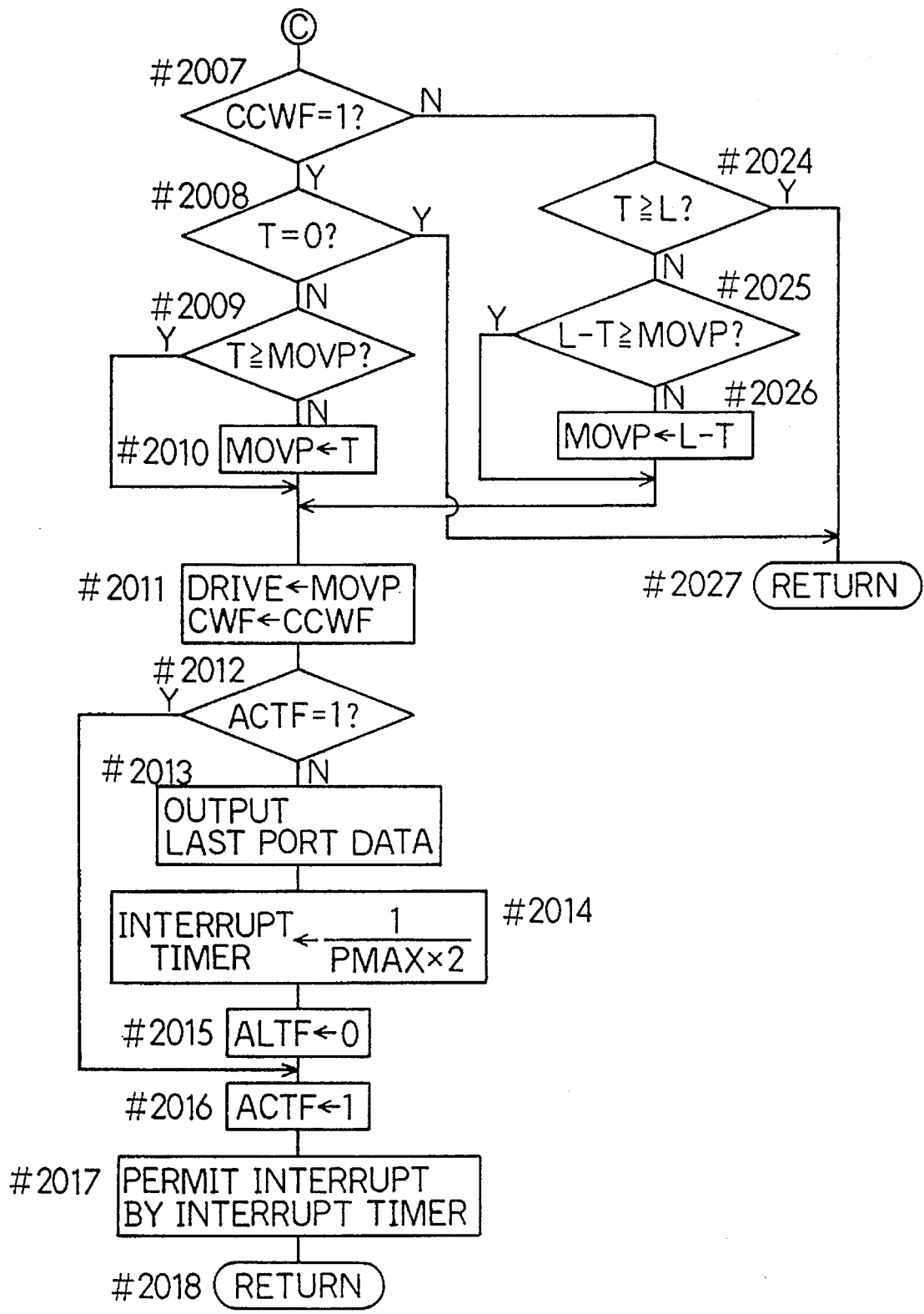

Referring to FIGS. 22 and 23, the subroutine MOTOR (corresponding to step #1411 of FIG. 15, step #1520 of FIG. 17 and steps #1915 and #1908 of FIG. 21) will be described. When the subroutine MOTOR is started (#200), first, whether the lens is being driven at the present time (ACTF=1) or not is determined (#2001). When the focusing lens is stopped at the present time (ACTF=0), step #2002 is skipped and the process proceeds to step #2003. When the focusing lens is being driven at the present time (ACTF=1), whether or not the driving direction set at this time is the same as the direction in which the lens is being driven at the present time (CCWF=CWF) is determined (#2002).

When the driving direction set at this time is not the same as the direction in which the lens is being driven at the present time (CCWF≠CWF), the process returns (#2019). That is, the current driving condition is not changed. When the driving direction set at this time is the same as the direction in which the lens is being driven at the present time (CCWF=CWF), whether the set driving pulse number MOVP is 0 or not is determined (#2003). When the driving pulse number MOVP is 0, the process returns (#2019). When the driving pulse number MOVP is not 0, the process proceeds to step #2004.

Then, the lens driving range is limited. Whether the dioptric power returning processing is being performed at the present time (DRF=1) or not is determined (#2004). When the dioptric power returning processing is not being performed (DRF=0), whether the dioptric power adjustment is being performed (DAF=1) or not is determined (#2005). When the dioptric power adjustment is not being performed (DAF=0), PCNT is set to T and LIMAF is set to L (#2006). Then, the process proceeds to step #2007 (FIG. 23).

When the dioptric power returning processing is being performed (DRF=1) or when the dioptric power adjustment is being performed (DAF=1), LIMSI is set to L (#2020). Then, which of the focusing lenses FL of the right and left lens barrels 1 and 2 is driven is determined (#2021). When the focusing lens FL of the right lens barrel 1 is driven (DL=R), SIDOR is set to T (#2023), and the process proceeds to step #2007 (FIG. 23). When the focusing lens FL of the left lens barrel 2 is driven (DL=L), SIDOL is set to T (#2022), and the process proceeds to step #2007 (FIG. 23).

At step #2007 (FIG. 23), whether the driving direction is the set driving direction or not (i.e. whether CCWF is 1 or 0) is determined. When the lens is driven toward the infinity side (CCWF=1), whether T=0 or not is determined (#2008). When T=0, in the automatic focusing and in the manual focusing, the lens is located at the infinity position at the present time. Therefore, to inhibit further driving of the lens toward the infinity side, the process returns (#2027). In the dioptric power correction and in the dioptric power returning, the lens is located at the maximum correction position of the myopic eye E2. Therefore, to inhibit further correction of the myopic eye E2, the process returns (#2027).

When T>0, whether T is greater than the set driving pulse number (T≦MOVP) or not is determined (#2009). When T≦MOVP, the process proceeds directly to step #2011. When T<MOVP, after the value of T is re-set to MOVP (#2019), the process proceeds to step #2011. By this processing, the lens is not driven beyond the infinity position in the automatic focusing and in the manual focusing, and the correction is not made beyond the set maximum correction amount for the myopic eye E2.

When it is determined at step #2007 that the lens is driven toward the near side (CCWF=0), T and L are compared (i.e whether T≦L or not is determined) (#2024). When T≦L, in the automatic focusing and in the manual focusing, since the present focusing lens position is located at the nearest focusing lens position or on the further near side of the nearest focusing lens position, the process returns to inhibit further driving of the lens toward the near side (#2027). In the dioptric power adjustment and in the dioptric power correction, since the present dioptric power correction position is located at the maximum correction position for the hypermetropic eye E3 or at a position beyond the maximum correction position, the process returns to inhibit further correction (#2027).

When T<L, L−T and MOVP are compared (i.e. whether L−T≦MOVP or not is determined) (#2025). When L−T<MOVP, the process proceeds to step #2011. When L−T<MOVP, L−T is re-set to MOVP (#2026), and the process proceeds to step #2011. Thereby, in the automatic focusing and in the power focusing, the lens is inhibited from being driven beyond the nearest focusing position, and in the dioptric power adjustment and in the dioptric power returning, the correction is inhibited from being made beyond the set maximum dioptric power correction amount for the hypermetropic eye E3.

At step #2011, the set driving pulse number MOVP is set to DRIVE, and the set driving direction CCWF is set to CWF. Then, whether the lens is being driven at the present time (ACTF=1) or not is determined (#2012). When the lens is being driven at the present time (ACTF=1), to maintain the continuity of the driving, steps #2013, #2014 and #2015 are skipped and the process proceeds to step #2016. When the lens is stopped at the present time (ACTF=0), since the motor is deactivated at the present time, to surely drive the first pulse of the stepping motor, the last output of the motor bus is directly outputted (#2013).

Then, 1/(PMAX×2) is set to an interrupt timer for applying an interrupt at a set period (#2014). Thereby, the interrupt timer applies an interrupt at a period twice the control period of the stepping motor generating the set speed PMAX. Then, ALTF is set to 0 (#2015). This is performed to shift a power ON timing in the subsequently-described driving of the focusing lenses FL of the right and left lens barrels 1 and 2. The details thereof will be described in the description of the routine of an interrupt by the interrupt timer. Then, 1 is set to ACTF showing that the lens is being driven at the present time (#2016), and an interrupt by the interrupt timer is permitted (#2017). Then, the process returns (#2018).

Figure 24:
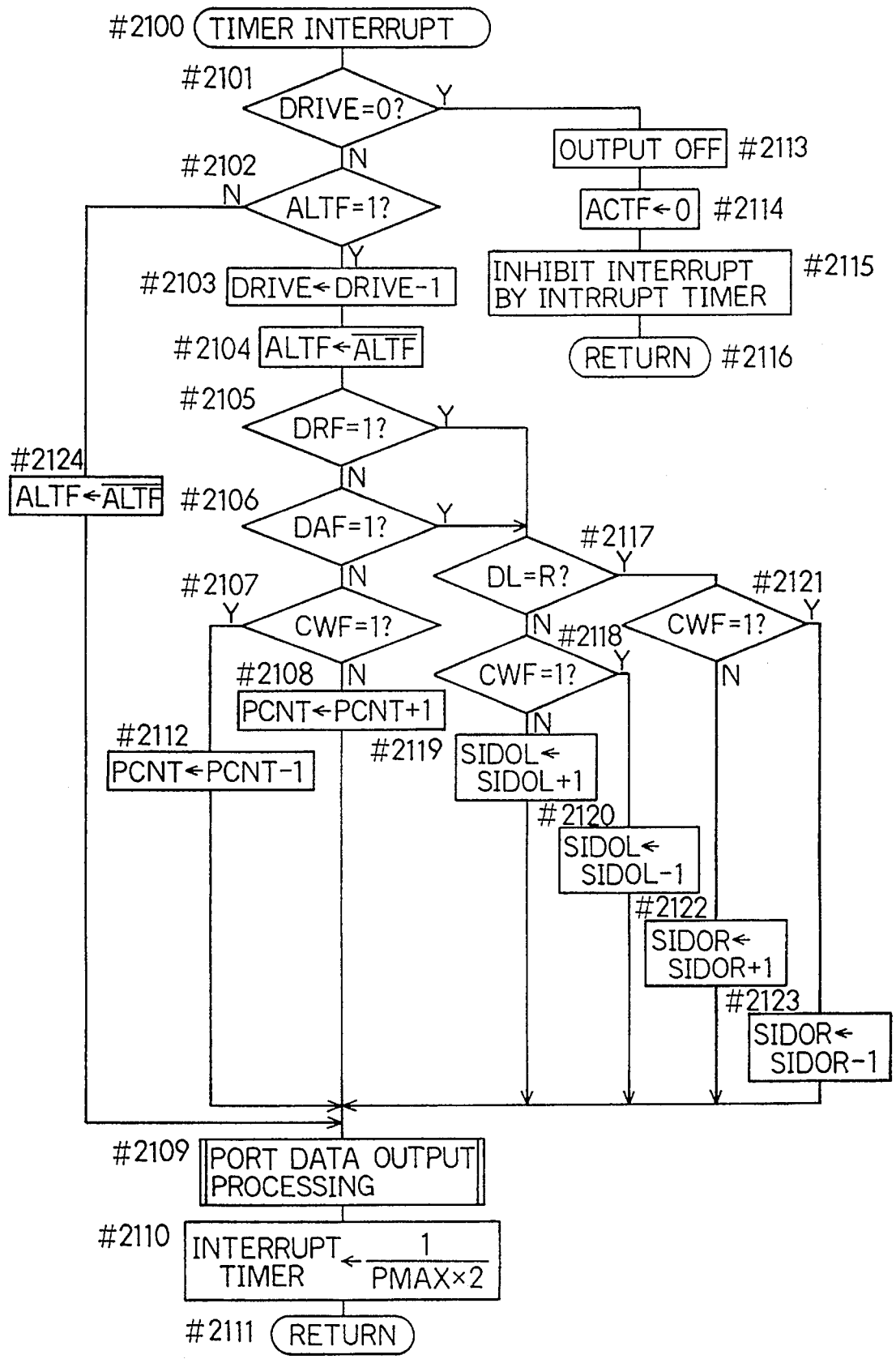
FIG. 24 is a flowchart of a timer interrupt processing of the embodiment of the present invention.

Referring to FIG. 24, the interrupt by the interrupt timer will be described. When the process enters the timer interrupt (#2100), first, whether the driving by an amount corresponding to the set driving pulse number is finished (DRIVE=0) or not is determined (#2101). When the driving is finished (DRIVE=0), the output of the stopping motor driver (motor driving circuit 605 of FIG. 8) is deactivated (#2113), the flag ACTF showing that the lens is being driven is cleared to 0 (#2114), and the interrupt by the interrupt timer is inhibited (#2115). Then, the process returns (#2116).

When it is determined at step #2101 that the driving amount is still left (DRIVE≠0), the condition of the flag ALTF is determined (#2102). When ALTF=0, 0 and 1 of the flag ALTF is reversed (#2124), and the process proceeds to step #2109. When ALTF=1, 1 is subtracted from DRIVE (#2103). Then, 1 and 0 of the flag ALTF is reversed (#2104). The reversing is performed in order to alternately drive the focusing lenses FL of the right and left lens barrels 1 and 2 pulse by pulse by controlling so that the stepping motor of the left lens barrel 2 is driven when ALTF=0 and that the stepping motor of the right lens barrel 1 is driven when ALTF=1. As described previously, 1 is subtracted from DRIVE when both the stepping motors of the right and left lens barrels 1 and 2 are driven by one pulse.

Then, whether the dioptric power returning processing is being performed (DRF=1) or not is determined (#2105). When the dioptric power returning processing is not being performed (DRF=0), whether the dioptric power adjustment is being performed (DAF=1) or not is determined (#2106). When the dioptric power adjustment is not being performed (DAF=0), the driving direction (i.e. whether CWF is 1 or 0) is determined (#2107). When the lens is driven toward the infinity side (CWF=1), 1 is subtracted from PCNT (#2112). When the lens is driven toward the near side (CWF=0), after 1 is added to PCNT (#2108), the process proceeds to step #2109. As described with reference to FIG. 36, PCNT is set to 0 when the focusing lens FL is set at the infinity position, and the focusing lens positions are shown on the right and left lens barrels 1 and 2.

When the dioptric power returning processing is being performed (DRF=1) or when the dioptric power adjustment is being performed (DAF=1), first, whether the focusing lens FL of the right lens barrel 1 is driven or the focusing lens FL of the left lens barrel 2 is driven (i.e whether DL=R or DL=L) is determined (#2117). When the focusing lens FL of the left lens barrel 2 is driven (DL=L), the driving direction (i.e. whether CWF is 1 or 0) is determined (#2118). When the lens is driven toward the infinity side (CWF=1), 1 is subtracted from SIDOL (#2120). When the lens is driven toward the near side (CWF=0), after 1 is added to SIDOL (#2119), the process proceeds to step #2109. When the focusing lens FL of the right lens barrel 1 is driven (DL=R), the driving direction (i.e. whether CWF is 1 or 0) is determined (#2121). When the lens is driven toward the infinity side (CWF=1), 1 is subtracted from SIDOR (#2123). When the lens is driven toward the near side (CWF=0), after 1 is added to SIDOR (#2122), the process proceeds to step #2109.

At step #2109, a port data output subroutine in which a data is outputted to the motor bus to drive the motor IC (integrated circuit) is called (#2109). The port data output subroutine will be described later in detail with reference to FIG. 25. Then, 1/(PMAX×2) is set to the interrupt timer to set the next interrupt period (#2110). Then, the process returns (#2111).

By the above-described timer interrupt, the stepping motor is driven. PCNT shows the positions of the focusing lenses FL of the right and left lens barrels 1 and 2. SIDOR and SIDOL show the dioptric power correction positions of the right and left lens barrels 1 and 2, respectively.

Figure 25:
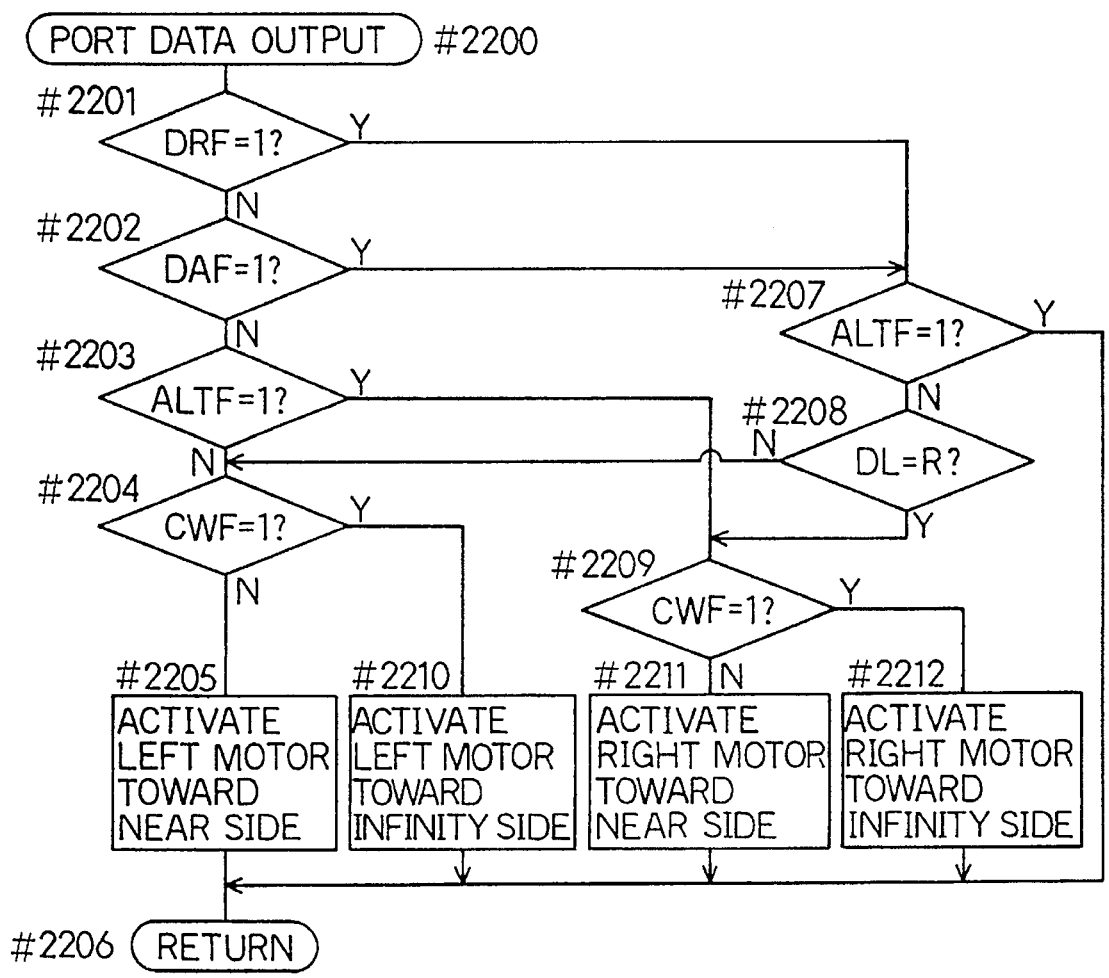
FIG. 25 is a flowchart of a port data output processing of the embodiment of the present invention.

Referring to FIG. 25, the port data output subroutine (corresponding to step #2109 of FIG. 24) will be described. When the process enters the port data output subroutine (#2200), first, whether the dioptric power returning processing is being performed (DRF=1) or not is determined (#2201). When the dioptric power returning processing is not being performed (DRF=0), whether the dioptric power adjustment is being performed (DAF=1) or not is determined (#2202). When the dioptric power adjustment is not being performed (DAF=0), whether the flag ALTF is 1 or not is determined (#2203). When ALTF=0, the condition of the flag CWF showing the driving direction of the focusing lens FL (i.e. whether CWF is 1 or 0) is determined (#2204). When CWF=0, the stepping motor of the left lens barrel 2 is activated through the motor bus to step-drive the focusing lens FL of the left lens barrel 2 by one step toward the near object side (#2205). Then, the process returns (#2206).

When it is determined at step #2204 that CWF=1, the stepping motor of the left lens barrel 2 is activated through the motor bus to step-drive the focusing lens FL of the left lens barrel 2 by one step toward the infinity object side (#2210). Then, the process returns (#2206). When ALTF=1 (#2203), like step #2204, the condition of the flag CWF is determined (#2209). When CWF=0, the stepping motor of the right lens barrel 1 is activated through the motor bus to step-drive the focusing lens FL of the right lens barrel 1 by one step toward the near object side (#2211). Then, the process returns (#2206).

When it is determined at step #2209 that CWF=1, the stepping motor of the right lens barrel 1 is activated through the motor bus to step-drive the focusing lens FL of the right lens barrel 1 by one step toward the infinity object side (#2212). Then, the process returns (#2206).

As described in the description of the timer interrupt (FIG. 24), 0 and 1 of the flag ALTF are reversed every time one timer interrupt is applied. For this reason, by steps #2203, #2204, #2205, #2209, #2211 and #2212, the stepping motors of the right and left lens barrels 1 and 2 are alternately driven every time the timer interrupt is applied, and the stepping motors of the right and left lens barrels 1 and 2 are never simultaneously driven by one step.

When the dioptric power returning processing is being performed (DRF=1) or when the dioptric power adjustment is being performed (DAF=1) (#2201, #2202), the process branches to determine the condition of the flag ALTF (i.e. whether ALTF is 1 or 0) (#2207). When ALTF=1, the process returns without changing the activation condition of the stepping motor (#2206). When ALTF=0, the condition of the flag DL showing which of the stepping motors of the right and left lens barrels 1 and 2 is driven (i.e. Whether DL is R or L) is determined (#2208). When the stepping motor of the right lens barrel 1 is driven (DL=R), the process proceeds to step #2209 to perform the above-described processing of step #2211 or #2212. When the stepping motor of the left lens barrel 2 is driven (DL=L), after the process proceeds to step #2204, the above-described processing of step #2205 or #2210 is performed.

Thus, only either one of the focusing lenses FL of the right and left lens barrels 1 and 2 is driven in the dioptric power adjustment and in the dioptric power returning, so that either of the stepping motors of the right and left lens barrels 1 and 2 is driven once every two timer interrupts.

Figure 26:
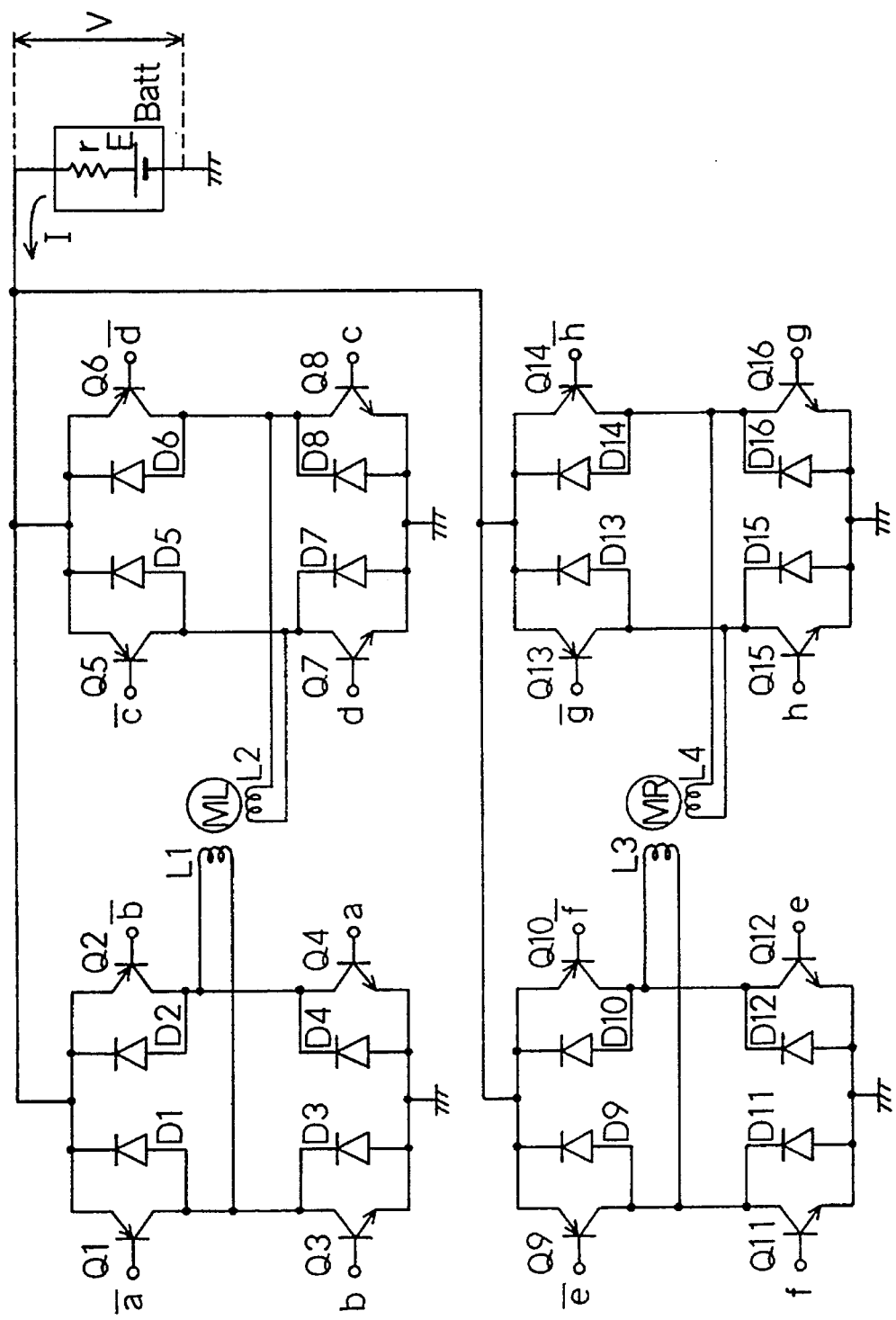
FIG. 26 is a circuit diagram of a motor driving circuit constituting the embodiment of the present invention.
Figure 27A:
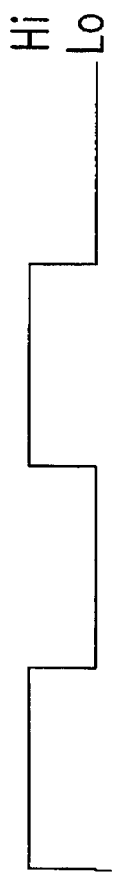
FIG. 27 is a time chart showing a motor driving timing of the embodiment of the present invention.
Figure 27B:
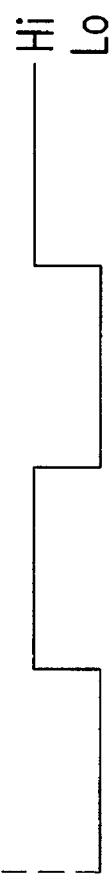
Figure 27C:
Figure 27D:

Referring to FIG. 26, the motor driving circuit 605 will be described. Two stepping motors, i.e. a left focusing lens driving motor ML and a right focusing lens driving motor MR are both of a bipolar type. Each motor has two-phase coils (L1 and L2, and L3 and L4). The coils L1 to L4 are respectively driven by H-type bridges by circuits including four switching devices Q1 to Q4, Q5 to Q8, Q9 to Q12 and Q13 to Q16 and four protecting devices D1 to D4, D5 to D8, D9 to D12 and D13 to D16.

Subsequently, the motor driving method used in this embodiment will be described with a two-phase excitation as an example with reference to FIG. 27. Driving signals of the H bridge (D1 to D4 and Q1 to Q4) which drives the coil L1 of the motor ML are shown at a and b. Likewise, driving signals of the H bridge (D5 to D8 and Q5 to Q8) which drives the coil L2 are shown at c and d. Driving signals of the H bridge (Q9 to Q12 and D9 to D12) which drives the coil L3 of the motor MR are shown at e and f. Driving signals of the H bridge (Q13 to Q16 and D13 to D16) which drives the coil L4 are shown at g and h. The current waveform and the voltage waveform of this time are shown in FIG. 28. As is understood from FIG. 28, when the motor is ON, the terminal voltage of the battery (battery 600) decreases due to an internal resistance r of the battery. In this embodiment, the driving timings of the motors MR and ML are shifted by T/4 from each other to reduce the decrease in voltage and the decrease in torque.

Figures 1E, 1F, 1G, 1H:
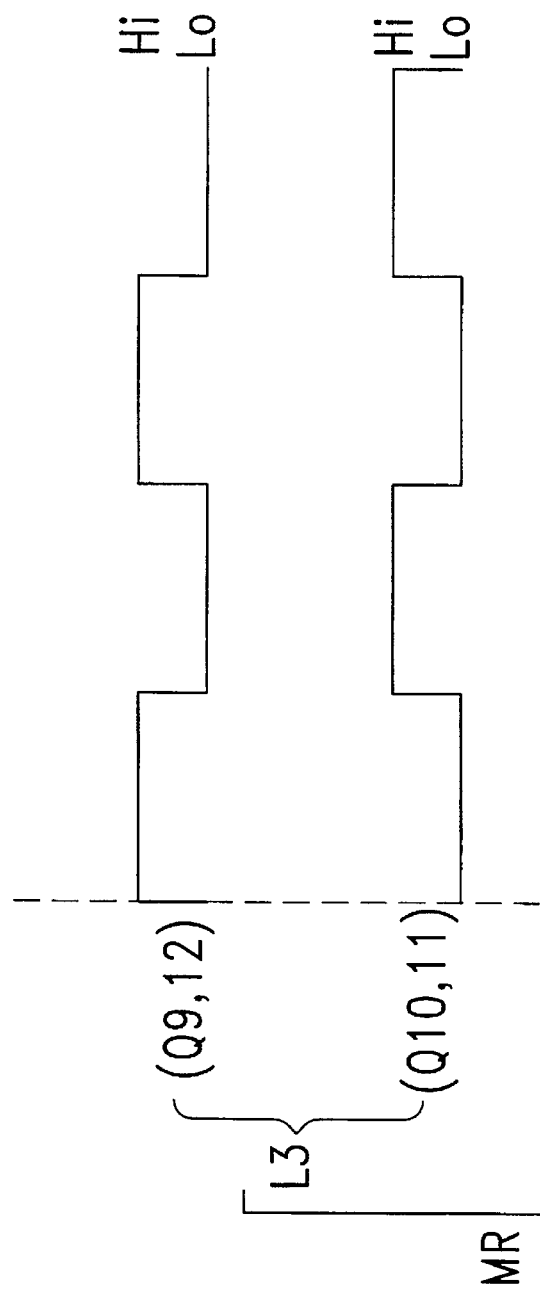
FIG. 1 is a time chart showing a conventional motor driving timing.
Figures 2A, 2B:
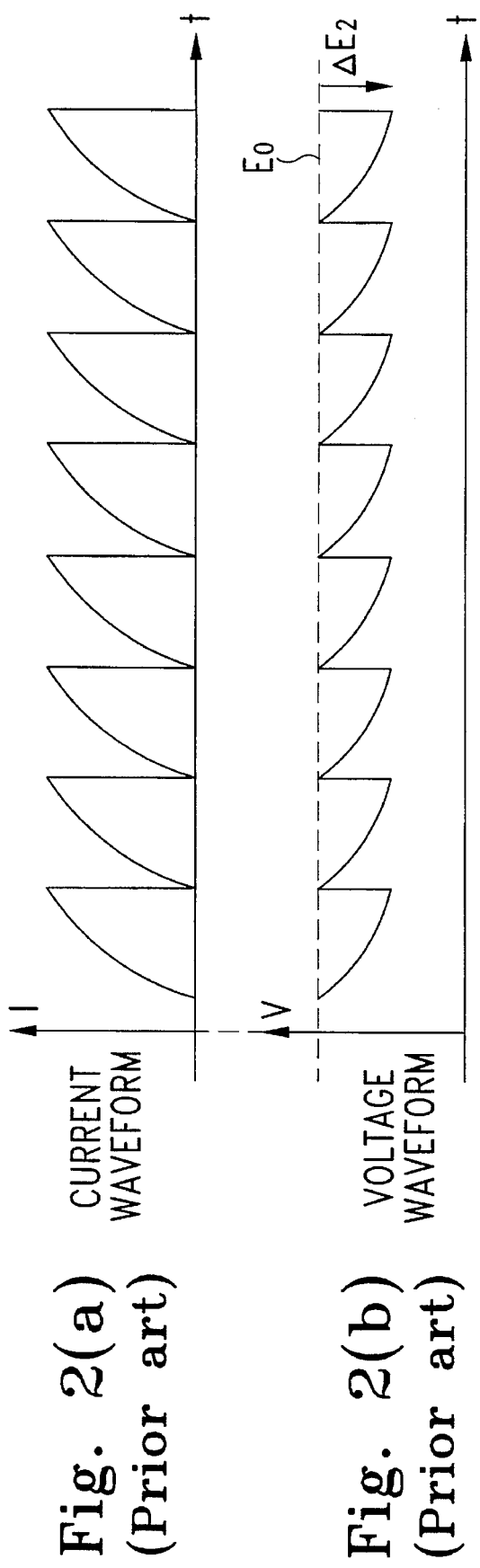
FIG. 2 is a time chart showing the current and voltage waveforms of the conventional motor driving timing.

FIGS. 1 and 2 show the driving timing of a conventional driving method in which the two motors are driven at the same timing, and its voltage and current waveforms, respectively. Since the current peak times of the two motors ML and MR overlap each other, the total amount of the current increases, so that the terminal voltage is considerably decreased. This leads to a decrease in torque. In this conventional driving method, the terminal voltage of the battery decreases by $\Delta E_2$ for a voltage $E_0$ obtained when the load is zero. According to the driving method of the embodiment of the present invention, the terminal voltage decreases by $\Delta E_1$ as shown in FIG. 28. $\Delta E_1$ is sufficiently small compared to $\Delta E_2$. Consequently, the decrease in torque of the motor is restrained accordingly.

Thus, one feature of this embodiment is that the activation timings of two or more stepping motors are shifted from each other to thereby shift the peaks of the currents flowing to the two or more motors. Since the activation timings of the left and right motors ML and MR are shifted from each other as described above, the consumed current is suitably averaged, so that the variation in power supply is reduced. In this case, although the two motors are alternately driven every predetermined unit, substantially, it seems as if the two optical systems are simultaneously driven, and no inconvenience is given to the user. According to this embodiment, the activation timings of the left and right motors ML and MR are shifted from each other, so that the surplus of the power supply and the generated torque are large compared to the simultaneously driving method. As a result, a motor which consumes less power can be used to reduce the current consumption.

According to this embodiment, the focusing of the left and right optical systems is realized with a simple arrangement, the current consumption and the variation in power supply are small, and the two optical systems can be driven substantially simultaneously. In addition, by using the stepping motor widely used as an actuator, a simple and low-cost driving system is realized.

In U.S. Pat. No. 4,659,201 and Japanese Laid-open Patent Application No. S61-183630, a driving system is proposed in which the activation start timings of a film winding motor and a mechanical charge motor are shifted from each other in a camera. However, these prior arts only disclose to prevent that a large current flows by shifting the activation start timings of two DC motors having different functions and are different from the embodiment of the present invention in which during the driving of the lens, the control (excitation) timings are continuously shifted and the motors are alternately driven every unit step. Therefore, these prior arts cannot solve the problems of the large variation in power supply and the decrease in generated torque caused when the left and right stepping motors are simultaneously activated.

While the reference dioptric power is 0 in the above-described embodiment, it may be a negative value since an object viewed through binoculars is usually located at a finite distance. For example, the reference dioptric power may be approximately −1.

Normally, the dioptric power of the human eye is between −3 and +1. A deviation of approximately ±1 can be corrected by the accommodation of the eye. Therefore, if the reference dioptric power is set to approximately −1, substantially, the eye with a dioptric power of −2 or 0 can be coped with. This applies to many people.

Obviously, many modifications and variations of the present invention are possible in light of the above teachings. It is therefore to be understood that within the scope of the appended claims, the invention may be practiced other than as specifically described.

TABLE 1

| SM | SDMD1 | SDMD2 | Main Switch Dial Position |
|---|---|---|---|
| 1 | 1 | 1 | OFF |
| 0 | 0 | 0 | Normal position |
| 0 | 1 | 0 | Dioptric power memory 1 |
| 0 | 0 | 1 | Dioptric power memory 2 |
| 0 | 1 | 1 | Dioptric power memory 3 |

What is claimed is:

1. A telescope comprising:

an optical system;

a dioptric power adjusting mechanism for driving the optical system to adjust a dioptric power;

a driving source which drives the dioptric power adjusting mechanism;

a specifying member which specifies a position of the optical system corresponding to a predetermined reference dioptric power; and a controller which controls the dioptric power adjusting mechanism so that the optical system is driven to a reference position specified by the specifying member.

2. A telescope as claimed in claim 1, further comprising:

a storing portion for storing therein a plurality of data each corresponding to a position of the optical system; and an operation member which specifies a storing of position data in the storing portion, wherein said dioptric power adjusting mechanism drives the optical system to a position stored in the storing portion in accordance with a specification by the specifying member.

3. A telescope as claimed in claim 2, further comprising a warning displaying member which provides a warning when the operation member is operated under a condition where the specifying member specifies the reference position.

4. A telescope as claimed in claim 1, wherein said optical system is an objective lens system of the telescope.

5. A telescope as claimed in claim 1, further comprising:

a second optical system;

a second dioptric power adjusting mechanism; and a second driving source, wherein said telescope constitutes a binocular.

6. A telescope as claimed in claim 1 wherein said predetermined reference dioptric power is obtained by an observation by an emmetropic eye when an object is located substantially at infinity.

7. A telescope comprising:

an optical system;

a dioptric power adjusting mechanism for driving the optical system to adjust a dioptric power;

a driving source which drives the dioptric power adjusting mechanism;

a specifying member which specifies a position of the optical system corresponding to a dioptric power of 0; and a controller which controls the dioptric power adjusting mechanism so that the optical system is driven to a reference position specified by the specifying member.

8. A telescope as claimed in claim 7, further comprising:

a storing portion for storing therein a plurality of data each corresponding to a position of the optical system; and an operation member which specifies a storing of position data in the storing portion, wherein said dioptric power adjusting mechanism drives the optical system to a position stored in the storing portion in accordance with a specification by the specifying member.

9. A telescope as claimed in claim 8, further comprising a warning displaying member which provides a warning when the operation member is operated under a condition where the specifying member specifies the reference position.

10. A telescope as claimed in claim 7, wherein said optical system is an objective lens system of the telescope.

11. A telescope as claimed in claim 7, further comprising:

a second optical system;

a second dioptric power adjusting mechanism; and a second driving source, wherein said telescope constitutes a binocular.

12. A telescope comprising:

an optical system;

a specifying member which is operable by an operator and specifies reset of a position of the optical system to a reference position corresponding to a predetermined reference dioptric power; and a dioptric power adjusting mechanism which automatically moves the optical system to the reference position.

13. A telescope comprising:

an optical system;

a specifying member which is operable by an operator and specifies reset of a position of the optical system to a reference position of a dioptric power of 0; and a dioptric power adjusting mechanism which automatically moves the optical system to the reference position.

* * * * *